United States Patent
Kaabi et al.

(10) Patent No.: US 12,069,228 B2
(45) Date of Patent: Aug. 20, 2024

(54) ARTIFICIAL PANORAMA IMAGE PRODUCTION AND IN-PAINTING FOR OCCLUDED AREAS IN IMAGES

(71) Applicant: FARO Technologies, Inc., Lake Mary, FL (US)

(72) Inventors: Hani Kaabi, Korntal-Münchingen (DE); Jafar Amiri Parian, Schlieren (CH)

(*) Notice: Subject to any disclaimer, the term of this patent is extended or adjusted under 35 U.S.C. 154(b) by 30 days.

(21) Appl. No.: 17/976,041

(22) Filed: Oct. 28, 2022

(65) Prior Publication Data

US 2023/0209035 A1 Jun. 29, 2023

Related U.S. Application Data

(60) Provisional application No. 63/294,199, filed on Dec. 28, 2021.

(51) Int. Cl.
H04N 13/257 (2018.01)
H04N 13/25 (2018.01)
H04N 13/271 (2018.01)

(52) U.S. Cl.
CPC .......... H04N 13/257 (2018.05); H04N 13/25 (2018.05); H04N 13/271 (2018.05)

(58) Field of Classification Search
CPC .............. G01S 17/86; G01S 17/894; G06T 2207/10024; G06T 2207/10028; G06T 2207/20016; G06T 5/50; G06T 5/77; H04N 13/25; H04N 13/257; H04N 13/271
See application file for complete search history.

(56) References Cited

U.S. PATENT DOCUMENTS

| 8,705,012 | B2 | 4/2014 | Greiner et al. |
| 9,918,070 | B2* | 3/2018 | Pavol .................. H04N 13/204 |
| 11,436,802 | B2* | 9/2022 | Iwamoto ................ G06T 17/00 |
| 2016/0314593 | A1 | 10/2016 | Metzler et al. |
| 2018/0096525 | A1* | 4/2018 | Turner ..................... G06T 7/90 |
| 2018/0122091 | A1* | 5/2018 | Herbst ................. G01S 7/4808 |

(Continued)

OTHER PUBLICATIONS

Parian et al., "Occlusion Detection for Laser Scan-Point Coloring," U.S. Appl. No. 63/180,281, filed Apr. 27, 2021.

(Continued)

*Primary Examiner* — Peter D Le
(74) *Attorney, Agent, or Firm* — McCarter & English, LLP; Dave S. Christensen

(57) ABSTRACT

A system includes a three-dimensional (3D) scanner, a camera with a viewpoint that is different from a viewpoint of the 3D scanner, and one or more processors coupled with the 3D scanner and the camera. The processors access a point cloud from the 3D scanner and one or more images from the camera, the point cloud comprises a plurality of 3D scan-points, a 3D scan-point represents a distance of a point in a surrounding environment from the 3D scanner, and an image comprises a plurality of pixels, a pixel represents a color of a point in the surrounding environment. The processors generate, using the point cloud and the one or more images, an artificial image that represents a portion of the surrounding environment viewed from an arbitrary position in an arbitrary direction, wherein generating the artificial image comprises colorizing each pixel in the artificial image.

12 Claims, 31 Drawing Sheets

(56) References Cited

U.S. PATENT DOCUMENTS

| | | |
|---|---|---|
| 2018/0262737 A1 | 9/2018 | Monnier et al. |
| 2018/0300937 A1* | 10/2018 | Chien .................. G06T 7/194 |
| 2019/0094346 A1 | 3/2019 | Dumoulin et al. |
| 2020/0082554 A1* | 3/2020 | Wang .................. G06T 7/521 |
| 2021/0209856 A1 | 7/2021 | Liukkonen et al. |

OTHER PUBLICATIONS

Wikipedia, Perspective-n-Point. Retrieved online at: https://en.wikipedia.org/Perspective-n-Point. 5 pages, Jul. 19, 2022.

European Office Action for Application No. 22207351.2, dated Apr. 11, 2023, 7 pages.

Song et al., Monocular Depth Estimation Using Laplacian Pyramid-Based Depth Residuals. IEEE Transactions on Circuits and Systems for Video Technology. Nov. 2021;31(11):4381-4393.

Vukasinovic et al., Correlation between Incident Angle, Measurement Distance, Object Colour and the Number of Acquired Points at CNC Laser Scanning. J Mechanical Engineering. 2012;58:23-28.

European Office Action for Application No. 22212061.0, dated May 3, 2023, 13 pages.

\* cited by examiner

810

| Function | Domain | Range |
|---|---|---|
| $\sin^{-1}(x)$ | $[-1, 1]$ | $\left[-\frac{\pi}{2}, \frac{\pi}{2}\right]$ |
| $\cos^{-1}(x)$ | $[-1, 1]$ | $[0, \pi]$ |
| $\tan^{-1}(x)$ | $(-\infty, \infty)$ | $\left(-\frac{\pi}{2}, \frac{\pi}{2}\right)$ |
| $\cot^{-1}(x)$ | $(-\infty, \infty)$ | $(0, \pi)$ |
| $\sec^{-1}(x)$ | $(-\infty, -1] \cup [1, \infty)$ | $\left[0, \frac{\pi}{2}\right) \cup \left(\frac{\pi}{2}, \pi\right]$ |
| $\csc^{-1}(x)$ | $(-\infty, -1] \cup [1, \infty)$ | $\left[-\frac{\pi}{2}, 0\right) \cup \left(0, \frac{\pi}{2}\right]$ |

FIG. 8

ARTIFICIAL PANORAMA IMAGE PRODUCTION AND IN-PAINTING FOR OCCLUDED AREAS IN IMAGES

CROSS REFERENCE TO RELATED APPLICATIONS

This application claims the benefit of U.S. Provisional Application Ser. No. 63/294,199, filed Dec. 28, 2021, the entire disclosure of which is incorporated herein by reference.

BACKGROUND

The subject matter disclosed herein relates to artificially generating panorama images using images and point clouds captured using a 3D coordinate measurement device. Further, the subject matter disclosure herein relates to capturing images using a camera and determining colors in occluded areas in the image by using the 3D coordinate measurement device.

A 3D coordinate measurement device can be a 3D laser scanner, or any other 3D scanner device. Typically, a 3D laser scanner, such as a time-of-flight (TOF) laser scanner, steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target. While a TOF laser scanner is generally used as an example 3D laser scanner when describing technical solutions herein, other types of laser scanners can also be used.

A TOF laser scanner is a scanner in which the distance to a target point is determined based on the speed of light in air between the scanner and a target point. Laser scanners are typically used for scanning closed or open spaces such as interior areas of buildings, industrial installations, and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored, and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or another angle transducer). The beam steering mechanism also includes a second motor that steers the beam of light about a second axis by a second angle that is measured by a second angular encoder (or another angle transducer).

Many contemporary laser scanners include a color camera mounted on the laser scanner for gathering digital camera images of the environment and for presenting the digital camera images to an operator of the laser scanner. By viewing the digital camera images, the operator of the scanner can determine the field of view of the measured volume and adjust settings on the laser scanner to measure over a larger or smaller region of space. In addition, the digital camera images may be transmitted to a processor to add color to the scanner image. To generate a color scanner image, at least three positional coordinates (such as x, y, z) and three color values (such as red, green, blue "RGB") are collected for each data point.

While existing 3D scanners are suitable for their intended purposes, what is needed is a 3D scanner having certain features of embodiments of the present disclosure.

BRIEF DESCRIPTION

According to one or more embodiments, a system includes a three-dimensional (3D) scanner, a camera with a viewpoint that is different from a viewpoint of the 3D scanner, and one or more processors coupled with the 3D scanner and the camera. The one or more processors access a point cloud from the 3D scanner and one or more images from the camera, the point cloud comprises a plurality of 3D scan-points, a 3D scan-point represents a distance of a point in a surrounding environment from the 3D scanner, and an image comprises a plurality of pixels, a pixel represents a color of a point in the surrounding environment. The one or more processors generate, using the point cloud and the one or more images, an artificial image that represents a portion of the surrounding environment viewed from an arbitrary position in an arbitrary direction, wherein generating the artificial image comprises colorizing each pixel in the artificial image.

In one or more embodiments, colorizing each pixel in the artificial image includes determining, for a pixel in the artificial image, a corresponding 3D scan-point from the point cloud. Further, the colorizing includes computing, for the 3D scan-point, a distance of the 3D scan-point from the camera. Further, the colorizing includes determining, based on the distance, an occlusion type of the pixel, wherein the occlusion represents visibility of the 3D scan-point from the 3D scanner and from the camera. Further, the colorizing includes assigning, the color to the pixel based on the occlusion type.

In one or more embodiments, in response to determining that the occlusion type of the pixel is type-I wherein the 3D scan-point is visible from both the 3D scanner and the camera, assigning the pixel the color as captured by the camera for the 3D scan-point.

In one or more embodiments, in response to determining that the occlusion type of the pixel is type-IV wherein the 3D scan-point is visible from neither the 3D scanner nor the camera, assigning the pixel the color by sampling colors assigned to pixels in a predetermined vicinity of the pixel.

In one or more embodiments, in response to determining that the occlusion type of the pixel is type-III wherein the 3D scan-point is visible from the camera, and not from the 3D scanner, assigning the pixel a color of a corresponding pixel from an image from the one or more images from the camera, wherein determining the corresponding pixel comprises determining a depth of the pixel using depths assigned to a set of pixels in a predetermined vicinity of the pixel.

In one or more embodiments, determining the depth of the pixel includes creating a depth map of the size of the artificial image. Determining the depth further includes determining a depth pixel in the depth map for each type I pixel from the artificial image, wherein the type I pixel is associated with the 3D scan-point that is visible from the 3D scanner and the camera, and wherein the 3D scan-point is measured by the 3D scanner. Determining the depth further includes assigning a depth value to the depth pixel in the depth map based on the 3D scan-point that is measured. Determining the depth further includes determining the depth of the type III pixel by creating a Laplacian pyramid based on the depth map.

In one or more embodiments, determining the depth of the pixel includes creating a depth map of the size of the artificial image, and determining a depth pixel in the depth map for each type I pixel from the artificial image, wherein the type I pixel is associated with the 3D scan-point that is visible from the 3D scanner and the camera, and wherein the 3D scan-point is measured by the 3D scanner. Determining the depth further includes assigning a depth value to the depth pixel in the depth map based on the 3D scan-point that is measured. Determining the depth further includes determining the depth of the type III pixel by using plane-fitting based on the depth map.

In one or more embodiments, in response to determining that the occlusion type of the pixel is type-II wherein the 3D scan-point is visible from the 3D scanner, and not from the camera, assigning the pixel the color based on one or more multi-band pyramids. Assigning the color includes generating two multi-band pyramids, a multi-band intensity pyramid pIR and a multi-band color pyramid pcolor for each 3D scan-point in the point cloud. Assigning the color further includes, for each level in the two multi-band pyramids, creating a mapping function T to predict color value from intensity based on the two multi-band pyramids, and for each voxel v in pIR where there is no corresponding voxel in pcolor applying T to the intensity value of v to get predicted color, and assigning the color to the pixel using pcolor.

In one or more embodiments, assigning the color to the pixel using pcolor includes converting pcolor to a voxel grid bp. Assigning the color further includes performing a Laplacian repair on bp using a point_expand operator on bp, and computing the color=T(IRpoint)— T(IRvoxel)+expanded_color.

In one or more embodiments, in response to determining that the occlusion type of the pixel is type-II wherein the 3D scan-point is visible from the 3D scanner, and not from the camera, assigning the pixel the color based on one or more Laplacian pyramids. Assigning the color includes creating a window w comprising pixels surrounding the pixel, removing, from w, pixels corresponding to 3D scan-points with depth less than a predetermined threshold, and computing multi-band pyramids pcolor and pIR for the remaining pixels in w. Further, assigning the color includes, for each level in the multi-band pyramids for a first pixel, creating a mapping function T to predict color value from intensity value, and for each pixel j in pIR where there is no corresponding pixel in pcolor applying T to the intensity value to get a predicted color. Further, assigning the color includes composing wp, which is a copy of w with updated colors for the pixels, wherein wp is composed from the Laplacian pyramid pcolor, wherein composing wp comprises assigning a color to each pixel in w including the pixel.

In one or more embodiments, in response to determining that the occlusion type of the pixel is type-II wherein the 3D scan-point is visible from the 3D scanner, and not from the camera, assigning the pixel the color based on one or more Laplacian pyramids. Assigning the color includes configuring L as number of levels of pyramids, and dividing the artificial image into a plurality of blocks, each block is 2L×2L in size. Further, assigning the color includes, for each block Bi from the plurality of blocks, identifying a set of pixels that are visible from both, the camera and the 3D scanner. Further, assigning the color includes, dividing the set of pixels into one or more clusters based on depth of 3D scan-points corresponding to the pixels. Further, assigning the color includes, for each cluster Cj from the one or more clusters, creating a Laplacian pyramid $pIR_{ij}$ using intensity values and a Laplacian pyramid $pColor_{ij}$ using color values. Further, assigning the color includes, for each level in the Laplacian pyramids, creating a mapping function Tij to predict a color value from an intensity value, and for each pixel q in pIR-ij level where there is no corresponding pixel in pcolor-ij applying Tij to the intensity value to get a predicted color. Further, assigning the color includes, for the pixel that is to be colored in the block Bi: determining j so that $|depth(p)-depth(C_{ij})|$ is minimum, and expanding Laplacian levels in $pColor_{ij}$ to get a color to assign to the pixel.

In one or more embodiments, determining that the 3D scan-point is occluded from only one of the camera and the 3D scanner comprises determining that more than one point in the point cloud are back-projected onto the same pixel in an image captured by the camera.

In one or more embodiments, determining that the scan-point is occluded from only one of the camera and the 3D scanner is based on an angle between a normal of the 3D scan-point and a back-projected ray from the 3D scan-point to the camera.

In one or more embodiments, the camera is an integral part of the 3D scanner.

In one or more embodiments, the camera is at an arbitrary location, different from the 3D scanner.

According to one or more aspects, a computer-implemented method includes accessing a point cloud from a 3D scanner and one or more images from a camera, the point cloud comprises a plurality of 3D scan-points, a 3D scan-point represents a distance of a point in a surrounding environment from the 3D scanner, and an image comprises a plurality of pixels, a pixel represents a color of a point in the surrounding environment. The computer-implemented method further includes generating, using the point cloud and the one or more images, an artificial image that represents a portion of the surrounding environment viewed from an arbitrary position in an arbitrary direction, wherein generating the artificial image comprises colorizing each pixel in the artificial image.

According to one or more embodiments, a computer program product comprising a memory device with computer executable instructions stored thereon, the computer executable instructions when executed by one or more processors cause the one or more processors to perform a method includes accessing a point cloud from a 3D scanner and one or more images from a camera, the point cloud comprises a plurality of 3D scan-points, a 3D scan-point represents a distance of a point in a surrounding environment from the 3D scanner, and an image comprises a plurality of pixels, a pixel represents a color of a point in the surrounding environment. The method further includes generating, using the point cloud and the one or more images, an artificial image that represents a portion of the surrounding environment viewed from an arbitrary position in an arbitrary direction, wherein generating the artificial image comprises colorizing each pixel in the artificial image.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 8 depicts a table that provides the domains and ranges of various trigonometric functions;

Figure 1:
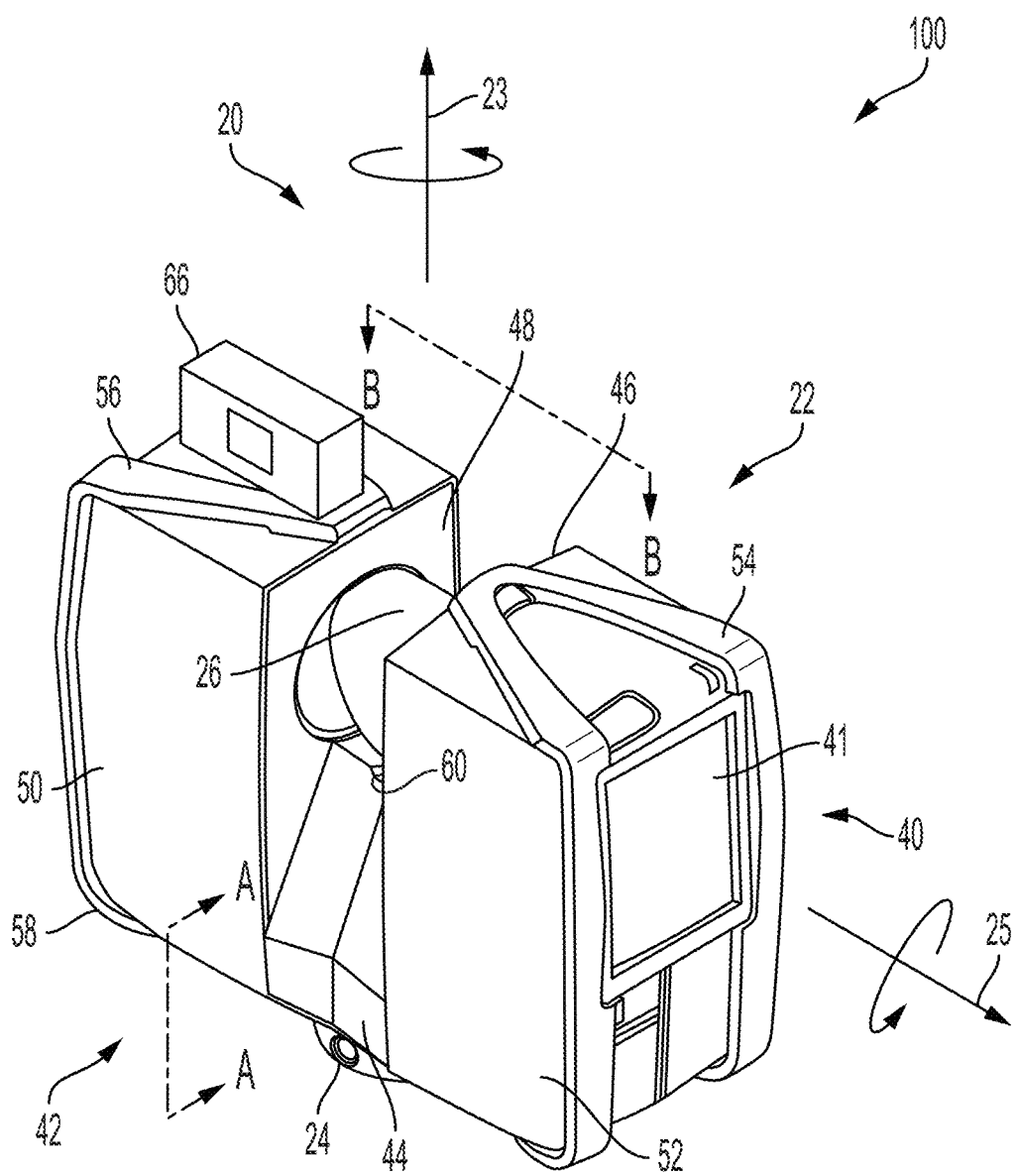
FIG. 1 is a perspective view of a laser scanner in accordance with an embodiment.

The detailed description explains embodiments of the invention, together with advantages and features, by way of example with reference to the drawings.

DETAILED DESCRIPTION

Embodiments herein relate to system that includes a three-dimensional (3D) measurement device and at least one camera to capture color images. The 3D measurement device can be a 3D scanner. The 3D scanner captures a point cloud representing a scene in a field-of-view (FOV) of the 3D scanner. The point cloud is a set of scan-points, each scan-point being captured from a surface in the scene. The scan-points have 3D coordinates representing their location in the scene. The 3D measurement device further includes a camera that acquires a 2D image of scene, for example, a color image using RGB, or any other coloring scheme.

Embodiments of technical solutions described herein facilitate production of a synthetic/artificial image from any arbitrary viewpoint using color images and 3D data captured by the 3D measurement device. The technical solutions address the technical challenge of reducing the number of scans to be captured/acquired of an environment to generate a map/digital-representation of the environment. Instead, using the technical solutions described herein, with fewer number of scans, an area that is missing from the captured data can be artificially produced in the digital-representation of the environment.

Further, embodiments of the technical solutions described herein facilitate determining a color for occluded areas in the 2D image based on the 3D point cloud. The result is an artificially colored 2D image with inpainting in the occluded areas. Further, the result includes an interactive 3D scan of the scene that includes the captured scan-points and corresponding color by mapping the colored 2D image with the 3D point cloud(s). Embodiments of the technical solutions described herein provide solutions to technical challenges in determining color of scan-points that may be occluded from the camera, as well as estimating an optimal color for portions that are occluded from the 3D scanner. Further, embodiments of the technical challenges provide improvement in accuracy of the generated color compared to existing inpainting techniques.

In the existing techniques, scan-points are typically colorized based on a ray-vector between the scan-point and the camera and a color of the closest scan-point from the camera on that ray vector. Technical solutions described herein improve the accuracy of the colorizing by accounting for the different positions of the camera and the 3D scanner. Even if the camera and the 3D scanner can be integrated into a single apparatus, because the two are separate devices, the position of the camera and the 3D scanner may be different. A technical challenge with colorization of a scan captured by the 3D scanner using images from an external camera is caused by a parallax caused by a difference between the position of the camera and the 3D scanner. The viewpoint of the 3D scanner viewpoint is different from the viewpoint of the camera, and hence the images. Accordingly, a scan-point that is visible to the camera may not be visible to the 3D scanner, and vice versa.

Several techniques have been proposed to colorize scan-points that are occluded from the camera. For example, see co-pending application 63/180,281, which is incorporated in its entirety herein. Embodiments of the technical solutions described herein provide further improvements. The technical solutions described herein address the technical challenge of creating an artificial panorama image at the same viewpoint as of the 3D scanner nodal point.

The creation of the artificial panorama image as provided by the technical solutions herein has several advantages. For example, once computed, the artificially generated image can be used to accelerate further processing of the map/digital-representation generation. Further, the artificially generated image is a bias-free viewpoint to 3D scanner nodal point (i.e., the viewpoints of the 3D point cloud and the image are the same). Further, the image can be artificially created to include any arbitrary point and can be used in mobile mapping applications. These and other advantages and practical applications of the improvements provided by the technical solutions are described herein.

Figure 2:
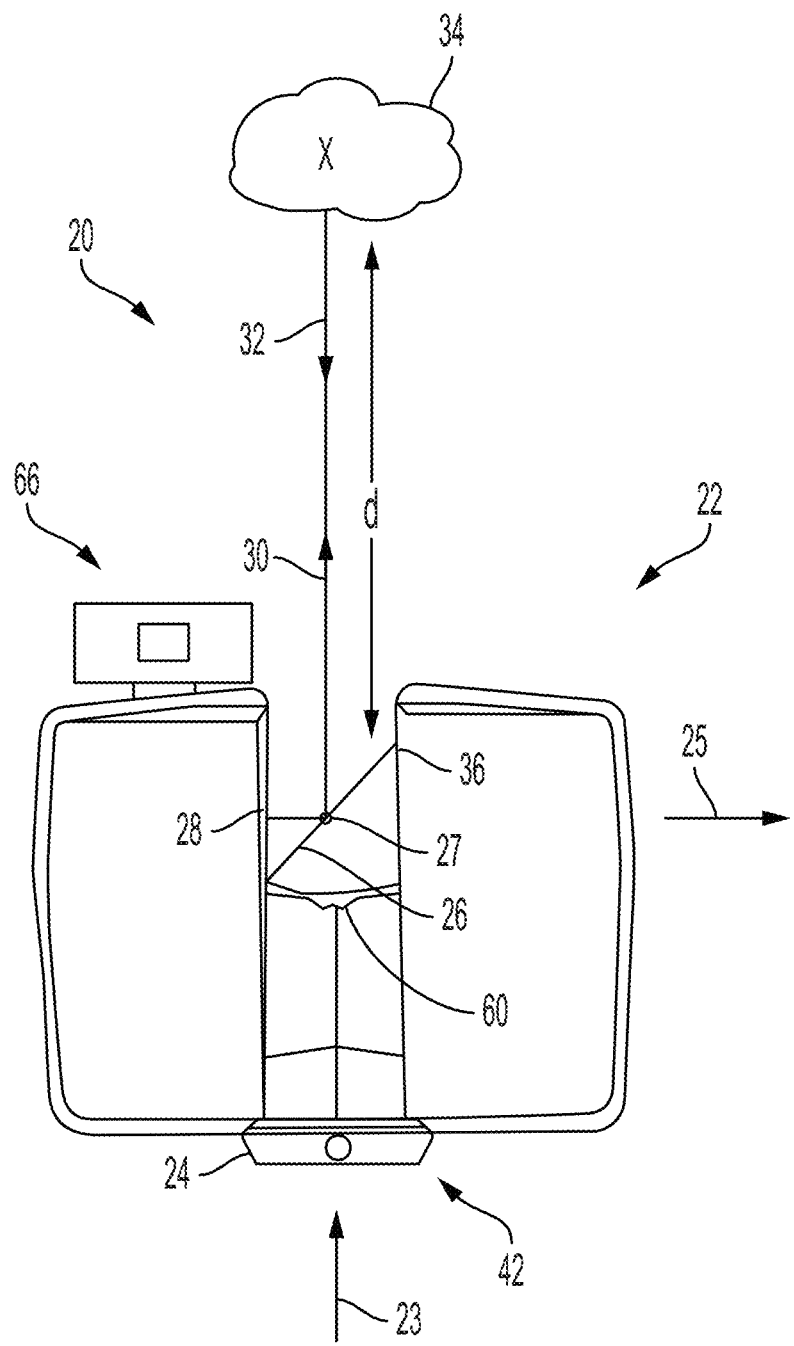
FIG. 2 is a side view of the laser scanner illustrating a method of measurement according to an embodiment.

Referring now to FIGS. 1-2, a measurement device 100 includes a laser scanner 20 for optically scanning and measuring the environment surrounding the measurement device 100. The measurement device 100 further includes a camera 66 to capture color images of the surroundings.

The laser scanner 20 is an example 3D measurement device according to one or more embodiments of the technical solutions described herein. It should be noted that the 3D measurement device can be other types of devices than the laser scanner 20 of FIG. 1. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms "azimuth axis" and "zenith axis" may be substituted for the terms "vertical axis" and "horizontal axis," respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X (FIG. 2), a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received intensity (equivalent to the term "brightness" or "optical power") value. The gray-scale value may be determined at least in part, for example, by integration of the bandpass-filtered and amplified signal in the light receiver 36 over a measuring period attributed to the object point X. As will be discussed in more detail herein, the intensity value may be used to enhance color images that are used to colorize the scanned data.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera. The color camera can be equipped with a rectilinear lens, an ultrawide-angle lens, sometimes referred to as a "fisheye camera," or any other such lens to capture the color information of the one or more surfaces in the volume captured by the laser scanner 20. Herein, the auxiliary image acquisition device 66 is also referred to as a "camera," however, as noted, can include other types of devices listed above.

In an embodiment, the camera 66 is rotated by a motor 138 and the angular/rotational position of the camera 66 can be measured by angular encoder 132. The camera 66 obtains 2D images of the scanned area to capture color data to add to the captured point cloud. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the camera 66 about the axis 25.

Figure 3:
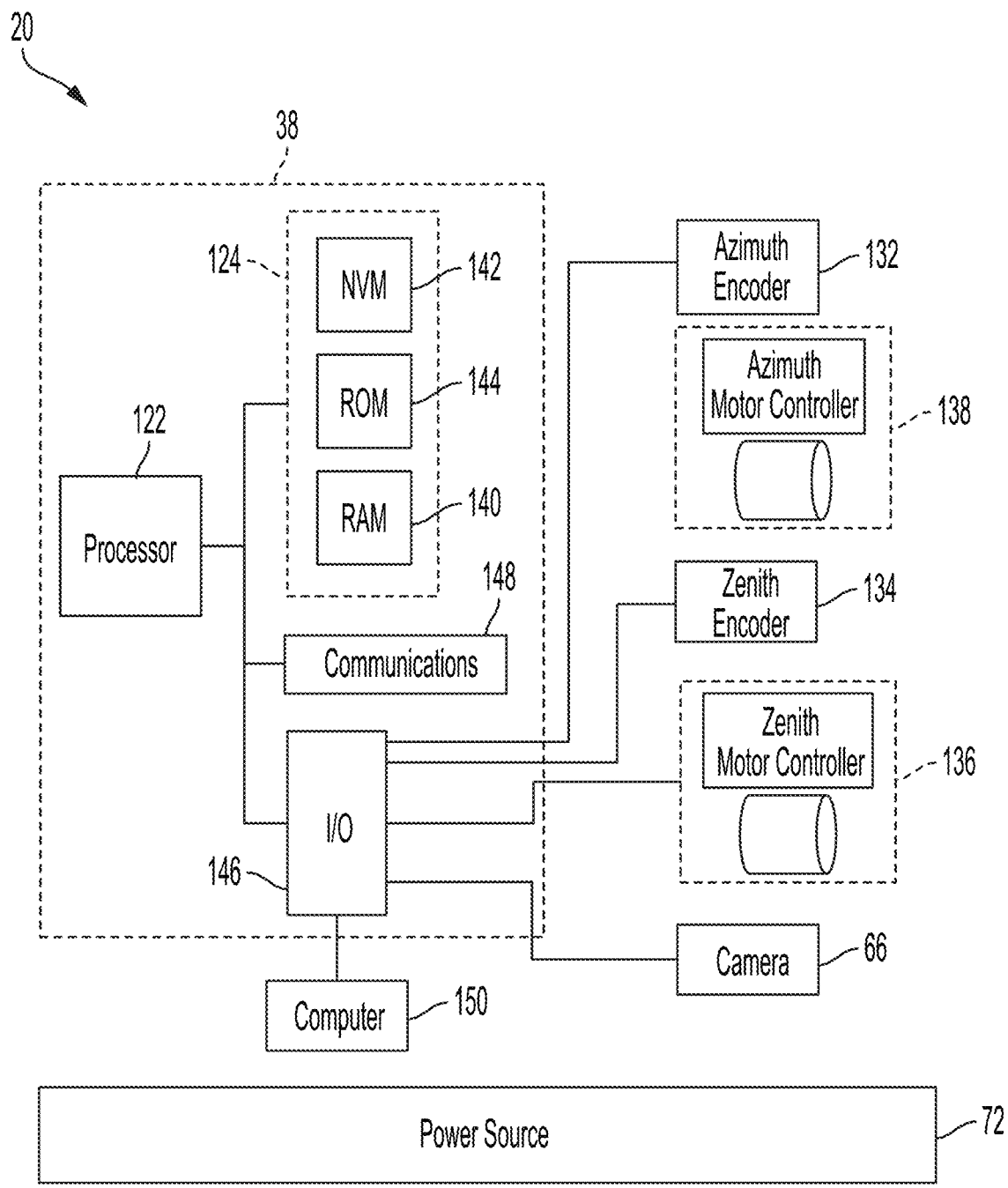
FIG. 3 illustrates a schematic illustration of the laser scanner of FIG. 1 according to an embodiment.

Referring now to FIG. 3 with continuing reference to FIGS. 1-2, elements are shown of the measurement device 100. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 can convert the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by the camera 66, angular/rotational measurements by a first or azimuth encoder 132, and angular/rotational measurements by a second axis or zenith encoder 134.

In general, controller 38 accepts data from encoders 132, 134, light receiver 36, light source 28, and camera 66 and is given certain instructions for the purpose of generating a 3D point cloud of a scanned environment. Controller 38 provides operating signals to the light source 28, light receiver 36, camera 66, zenith motor 136, and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 40 may be one or more LEDs (light-emitting diodes) 82, an LCD (liquid-crystal diode) display, a CRT (cathode ray tube) display, a touchscreen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods described herein, which can be embodied in application code. For example, these methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hypertext Markup Language), Python, Ruby and any combination or derivative of at least one of the foregoing.

In some embodiments, the controller 38 provides the data captured by the measurement device 100, i.e., the point cloud(s) and captured image(s) to a computer 150. The controller 38 communicates with the computer via a wired or wireless network. The computer 150 processes the data that is captured by the measurement device 100, as described herein.

In one or more embodiments, as depicted in FIGS. 1-2, the image acquisition device 66 is coupled to the laser scanner 20. Alternatively, the image acquisition device 66 is part of an assembly, for example, on a stand (e.g., tripod), a movable cart which can be moved manually, semi-autonomously, or autonomously.

In a measurement device that includes a single device, such as the camera 66 by itself, or the laser scanner 20 by itself, "occlusions" are the regions on the object surface (34), which are not seen by that device. It should be appreciated that while embodiments herein illustrate the camera 66 as being mounted on the external surface of the scanner, this is for example purposes. In other embodiments, the camera 66 may be mounted in different locations, including but not limited to internal to the laser scanner housing, or more than camera 66 may be provided. If the measurement device 20 includes two (or more) devices (for example, FIG. 1, laser scanner 20 and external camera 66), the "occlusion" is a region in each measurement, which is seen by one device, but not seen (measured or observed) by the other device. In other words, in measurement devices that include two devices, the occluded regions include the regions which are only measured by one device from the measurement device, along with regions that are not measured by either device. For example, in the case of the measurement device 100, the camera 66 sees a region, but the laser scanner 20 does not, or vice versa.

As noted earlier, such occlusions in measurement devices 100 including two or more devices, pose additional technical challenges. For example, to colorize the point cloud from the laser scanner 20 with the images from the camera 66, a region (scan-points in the point cloud) can be colorized only if that region is seen by (i.e., is within the field of view of) the camera 66 also. If this is not the case, inaccurate colorization of the scan-points in the region may result. Technical solutions described herein address such inaccuracies in colorization. Technical solutions described herein, in some embodiments, facilitate detecting the occluded regions/pixels, and categorizing the regions/pixels. Based on the categorizations, embodiments of the technical solutions herein avoid assigning a color to particular occluded regions, and avoid a wrong color being used. Further, technical solutions described herein facilitate to colorize the point cloud reliably in other types of occluded regions.

Table 1 depicts indicates the different types of occlusions (described herein) and the colorization techniques used by the technical solutions described herein.

TABLE 1

| Point Type | Visible from Scanner (in Point Cloud) | Visible from Camera (in Images) | Colorization |
|---|---|---|---|
| I | Yes | Yes | Non-occluded points; color information available. |
| II | Yes | No | Color occluded; estimate color using in-painting method herein |
| III | No | Yes | Position mapping occluded; estimate mapping using in-painting method herein |
| IV | No | No | Color and position mapping occluded; 2D in-painting methods from literature can be used for these points. |

As noted in Table 1, non-occluded points, i.e., type I points are those that have colorization information by virtue of being visible from both, the scanner 20 and the camera 66. Accordingly, the captured information from the devices can be used to colorize the non-occluded points. For the points of type IV, where the points are visible neither to the camera 66 nor the scanner 20, any of the already known or upcoming techniques for determining color for such points, or a combination thereof, can be used. Such techniques can use color information from the pixels in the vicinity, for example.

Technical solutions are described herein for determining colors for points of type II and type III, which are occluded from one device, but not the other. Type II point colors are not measured by the camera 66. Accordingly, the colors for these points have to be estimated.

Figure 4:
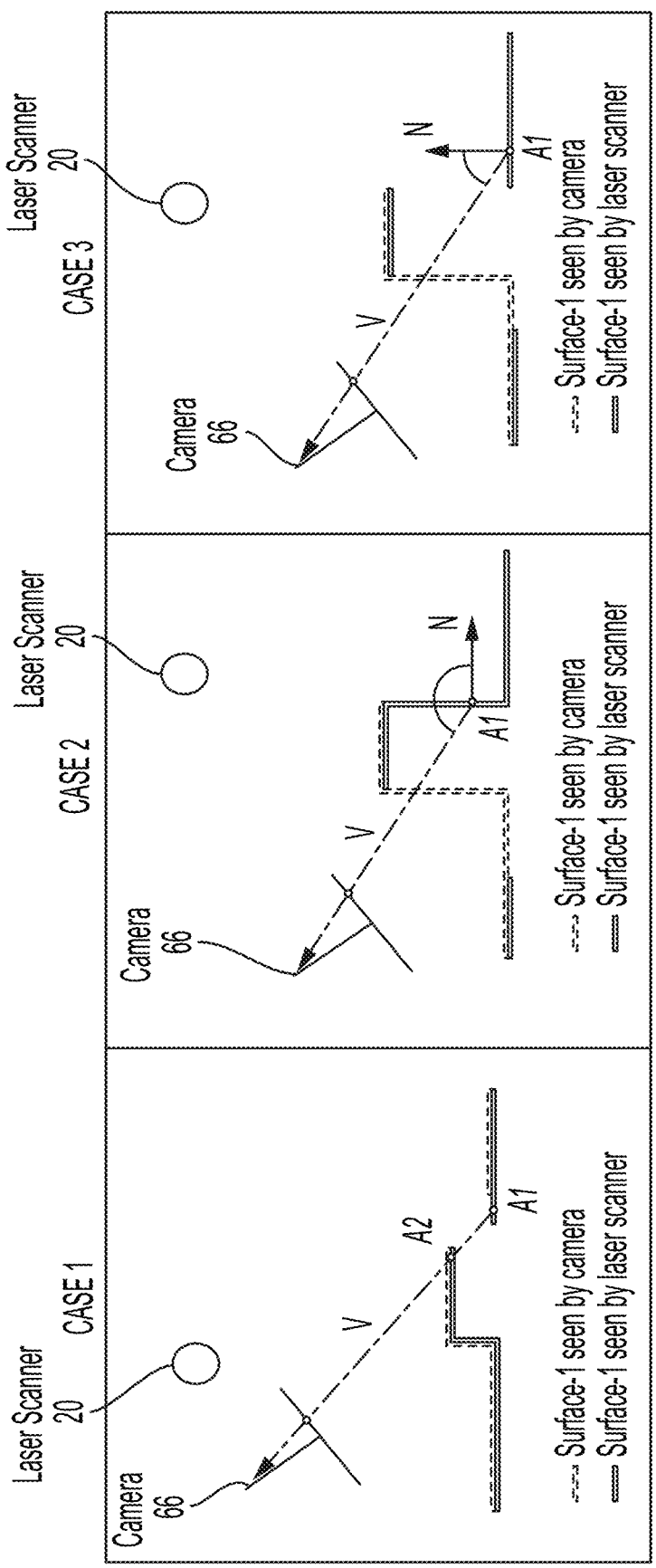
FIG. 4 shows different types of occlusions that can occur when using the laser scanner of FIG. 1.

FIG. 4 shows different types in which point A1 is an occluded point of type II, which is measured by the laser scanner 20, but it is not seen by the camera 66. There are three sub-categories (types 1/2/3) of type II occlusion as described herein.

Case 1 shows occlusion type II-1. If along the back-projection vector V of point A1, there is a surface which is measured by the laser scanner 20 and is seen by the camera 66, then point A1 can be marked as occluded point (occluded by the surface). Here, "back-projection vector" V is a vector which is defined by two pints: object point in 3D space and the projection center of the camera 66. The origin of the back-projection vector V is the object point (i.e., A1 in this case). This condition means that: there is a point A2 on the surface of an object (34), which lies on the back-projection vector V, such that A2 is closer to the camera 66 (camera projection center) compared to A1, and that A2 is measured by the laser scanner 20 as well as being seen in the image from the camera 66.

Case 2 shows occlusion type II-2. If the normal vector N of point A1 has an angle larger than 90° with the back-projection vector V, then it means that A1 cannot be visible from the view of the camera 66. Therefore, A1 is marked as an occluded point.

Case 3 shows occlusion type II-3. In this case the normal vector N of the point A1 has an angle smaller than 90° with the back-projection vector V, which means that theoretically A1 can be visible from the view of the camera 66. Furthermore, the surface which is occluding A1 is not measured by the laser scanner 20.

In the case of a type II occluded point, the actual color is not measured by the camera 66. Hence, the color for pixels corresponding to type II points are estimated by embodiments of the technical solutions described herein. In the case of a type III occluded point, the actual real world data is measured by the camera 66. However, because these points are occluded from the 3D scanner, a mapping (3D point cloud correspondence) between the color image data of type III points to one or more pixels in a synthetic panorama is unknown. Embodiments of the technical solutions described herein facilitate mapping the color data of the type III occluded points to appropriate pixels in the synthetic, i.e., artificial images.

Figure 5:
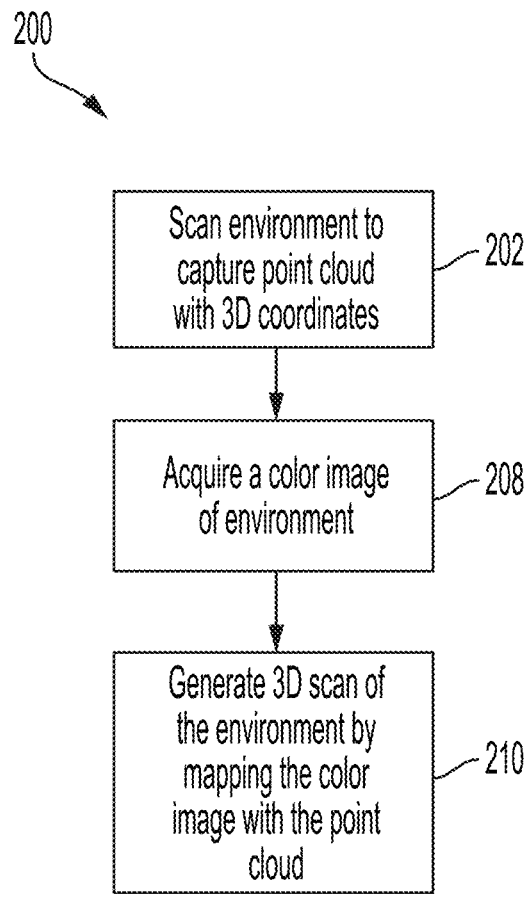
FIG. 5 depicts a flowchart of a method for generating a point cloud using a measurement device according to one or more embodiments.
Figure 6A:
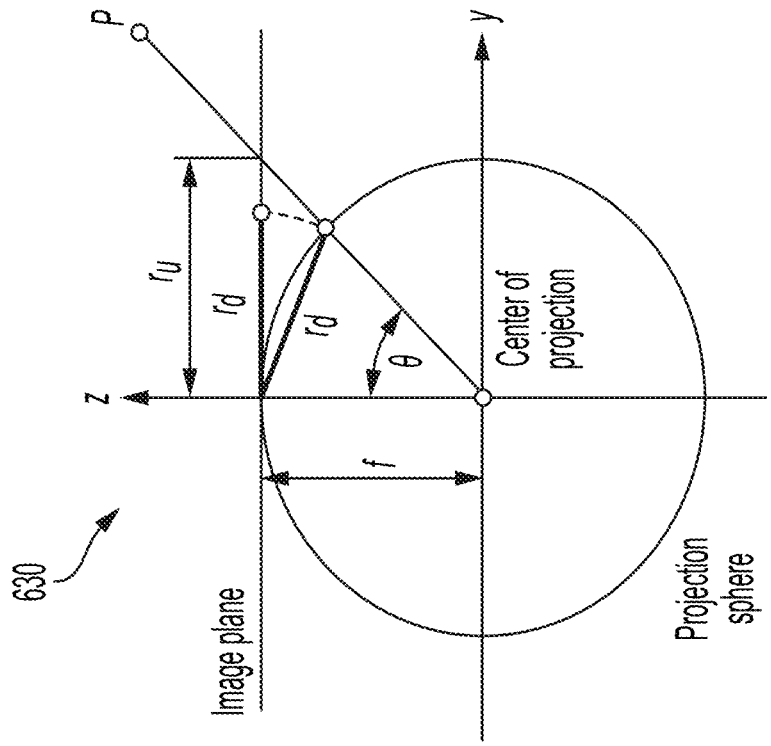
FIG. 6 depicts the projection types of ultrawide-angle (fisheye) lens and the path of light from a point in 3D space into the image plane.
Figure 6B:
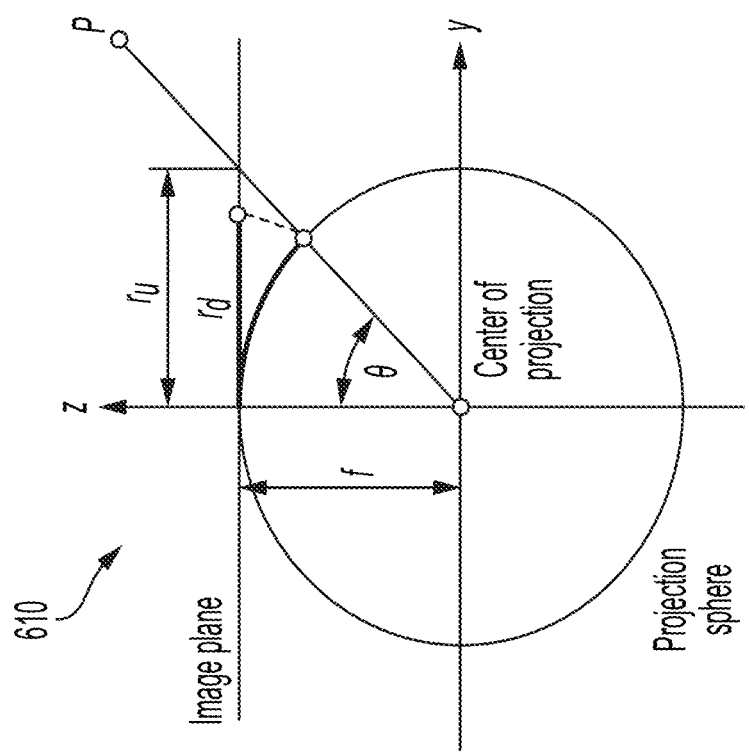
Figure 6C:
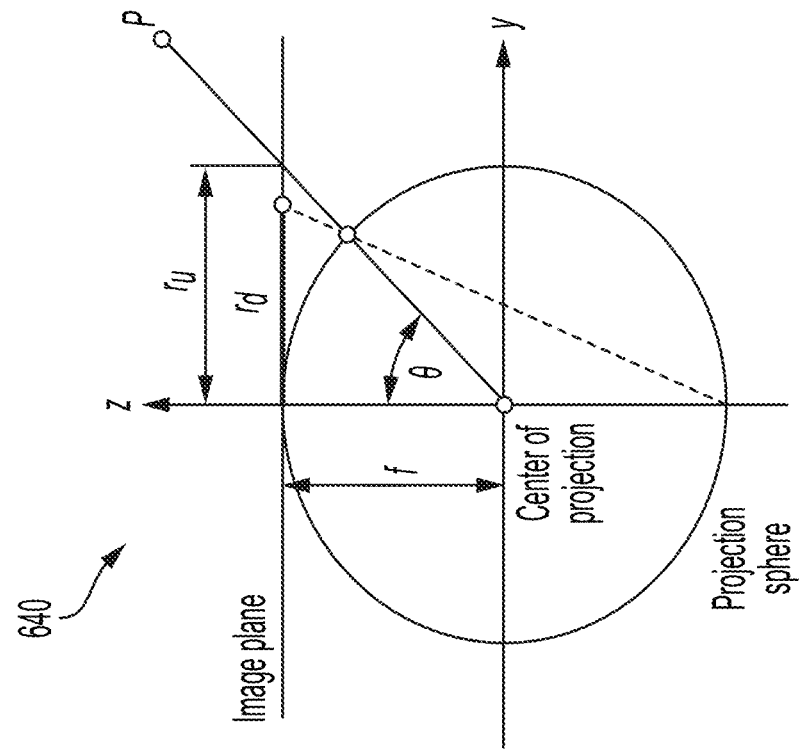
Figure 6D:
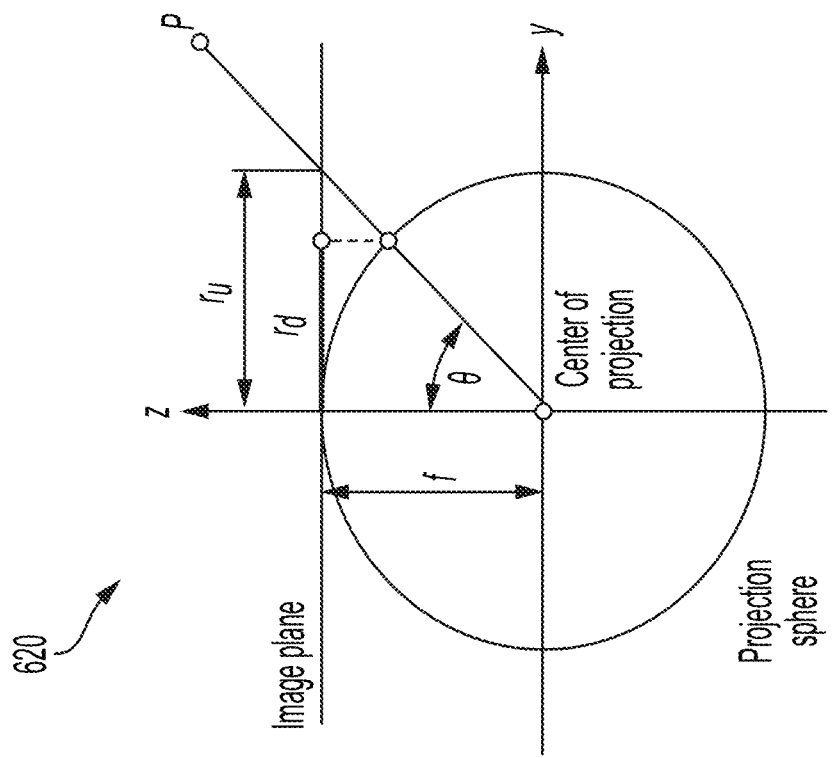

Referring now to FIG. 5, an embodiment of a method 200 is shown for generating a scan of the environment with the scanner 20. The method 200 begins in block 202 where the environment in which the scanner 20 is positioned is scanned. As described herein, the volume (e.g. the scan area) around the laser scanner 20 is performed by rotating the rotary mirror 26 relatively quickly about axis 25 while rotating the measuring head 22 relatively slowly about axis 23, thereby moving the assembly in a spiral pattern. Thus, for each light beam emitted, a distance value and the angles of the mirror 26 and the measurement head 22 is determined. Thus, a 3D coordinate of a scan-point in the environment may be determined for each emitted and received light beam. Further, for each light beam, an intensity value of the returned light beam is measured.

The light beams are emitted and received as the measurement head 22 is rotated 180 degrees about the axis 23. The method 200 further includes, at block 208, acquiring color images of the environment. In an embodiment, a 2D color image is acquired by the auxiliary image acquisition device 66. In an embodiment, one or more 2D images are acquired using an ultrawide-angle lens to capture color data in the spherical volume surrounding the laser scanner 20. In an embodiment, 2D acquired color images are in an RGB color model. In other embodiments, other color models, e.g., cyan, magenta, and yellow (CMY), or cyan, magenta, yellow, and black (CMYK), or any other color model can be used. In yet other embodiments, where an ultrawide-angle lens is not used, much more 2D images are acquired to capture the color data in the spherical volume surrounding the laser scanner 20.

Once the color data is acquired, the method 200 includes, at block 210, generating a colorized 3D scan by mapping the 2D coordinates in the image(s) captured by the camera 66 with the 3D coordinates in the point cloud captured by the scanner 20. The mapping can be performed using any known techniques. An example mapping a 2D ultrawide-angle image with the 3D point cloud is described herein.

It should be appreciated that the method 200 provides advantages in generating enhanced color 3D scans over techniques that use HDR (High Dynamic Range) imaging techniques because of requiring fewer number of images to be captured by using an ultrawide-angle field of view.

In one or more embodiments, the auxiliary image acquisition device 66 can be an omnidirectional camera such as a RICOH® THETA® camera for example. The camera 66 can capture a 360° view of the environment by capturing two images substantially concurrently. The two images may be captured by two ultrawide-angle lenses that are positioned to be facing in opposite directions, each camera capturing a respective field of at least 180°. In some cases, the two images that are captured can have overlapping portions that can be combined/edited, either automatically or manually. It is understood that above description provides some examples of the ultrawide-angle lens, and auxiliary image acquisition device 66 that can be used in one or more embodiments, and that in other embodiments, different lenses and/or cameras can be used.

FIG. 6 depicts determining coordinates corresponding to pixels representing objects/surfaces captured by an ultra-wide-angle image according to one or more embodiments. A difference between an ultrawide-angle lens and a typical rectilinear lens is that the projection from a 3D point to a 2D image in the ultrawide-angle lens is intrinsically non-perspective. Depending on the amount of deviation of the ray, equations below, and FIG. 6 provide four different types of projections which characterize ultrawide-angle lenses:

Equidistant projection (610): $r_d = c \cdot \theta$

Orthographic projection (620): $r_d = c \cdot \sin(\theta)$

Equisolid-angle projection (630): $r_d = 2c \cdot \sin(\theta/2)$

Stereographic projection (640): $r_d = 2c \cdot \tan(\theta/2)$

Figure 7:
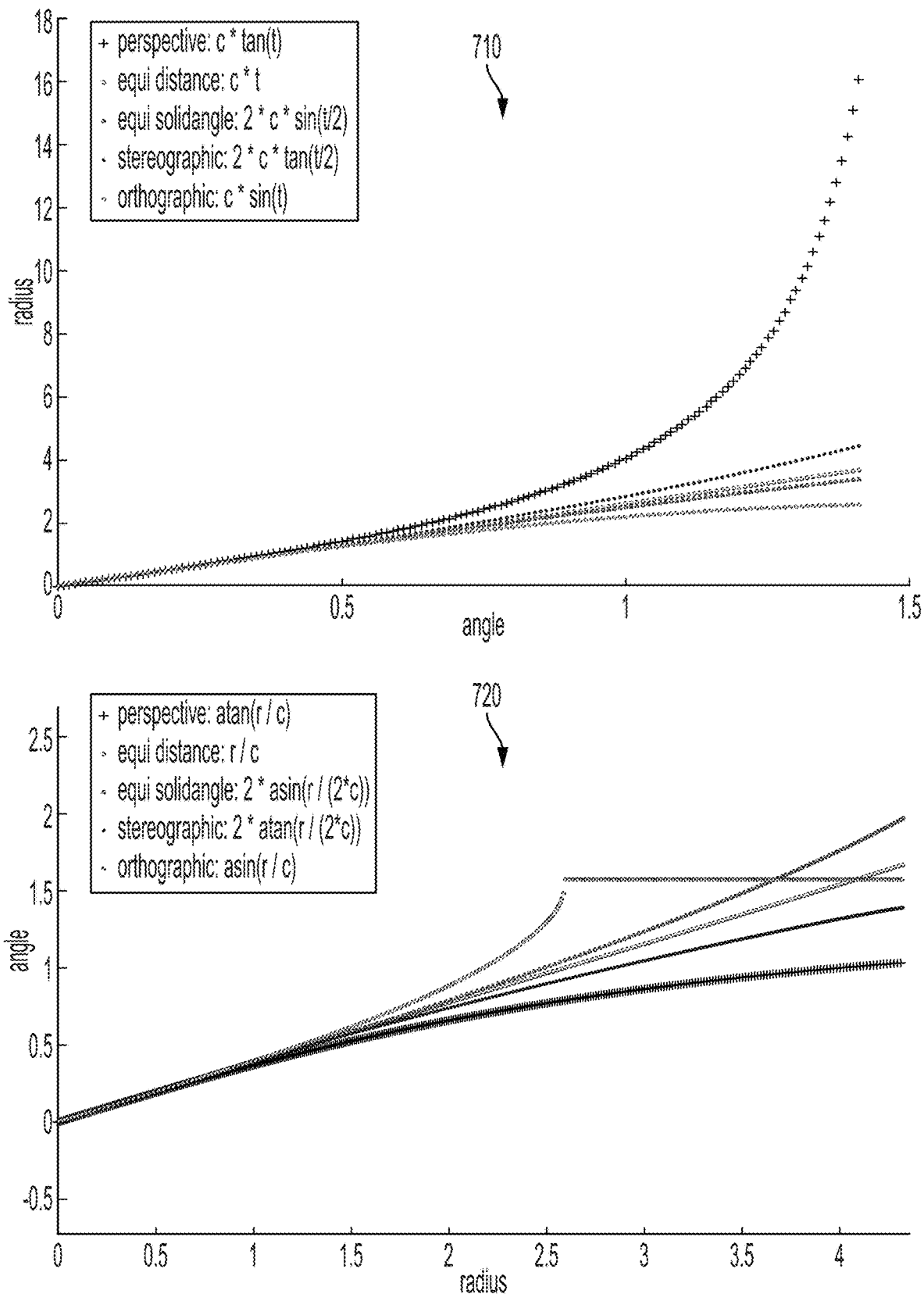
FIG. 7 shows the relation of radius and zenith angle (and reverse) for all ultrawide angle (fisheye) lens types at FIG. 6 including also the perspective projection.

Here, $\theta$ is the zenith angle, c is a camera constant (in millimeter or pixels), and $r_d$ is the radius of the image point P (from the principal point). FIG. 7 shows the relation of radius and zenith angle (and reverse) for perspective projection and the four ultrawide-angle lens projection types 610, 620, 630, 640. The plot 710 shows that a lens with perspective projection requires an infinite image plane to projection near (and less) than 180° field of view. The plot 720 shows that orthographic projection type cannot handle field of view near (and more) than 180°. Typically, lenses available are designed to produce an equidistant projection. For example, NIKON® 8-mm f/2.8, CANON® 7.5-mm f/5.6, SIGMA® 15-mm f/2.8 (180° FOV), NIKON® 6-mm (220° FOV), and RICOH® THETA® ultrawide-angle lens 2.6-mm (~204° FOV) are examples of equidistant projection ultrawide-angle lenses.

Collinearity equations represent a set of two equations, used in photogrammetry and remote sensing to relate coordinates in a sensor plane (in two dimensions) to object coordinates (in three dimensions). Equation (1) represents collinearity equations for a 2D ultrawide-angle lens as used in one or more embodiments:

$$\left. \begin{array}{l} x = -\dfrac{c}{m} \cdot \dfrac{U_X}{U_Z} \\ y = -\dfrac{c}{m} \cdot \dfrac{U_Y}{U_Z} \end{array} \right\} \quad (1)$$

Here, (x, y) is the image point coordinates in the photo coordinate system (e.g., millimeter or pixels), c is the camera constant, m is a ultrawide-angle lens coefficient factor (unit free). The (Ux, Uy, and Uz) are intermediate values that can be computed as follows:

$$\begin{pmatrix} U_X \\ U_Y \\ U_Z \end{pmatrix} = R^t \cdot \begin{pmatrix} X - X_0 \\ Y - Y_0 \\ Z - Z_0 \end{pmatrix}$$

Here, $(X_0, Y_0, Z_0)$ is the position of the center of projection (see FIG. 6), and (X, Y, Z) is the resulting object point coordinates in 3D space, and $R = R_X R_Y R_Z$, in which:

$$R_X = \begin{pmatrix} 1 & 0 & 0 \\ 0 & \cos(\omega) & -\sin(\omega) \\ 0 & \sin(\omega) & \cos(\omega) \end{pmatrix}, R_Y = \begin{pmatrix} \cos(\varphi) & 0 & \sin(\varphi) \\ 0 & 1 & 0 \\ -\sin(\varphi) & 0 & \cos(\varphi) \end{pmatrix},$$

$$\text{and } R_Z = \begin{pmatrix} \cos(\kappa) & -\sin(\kappa) & 1 \\ \sin(\kappa) & \cos(\kappa) & 1 \\ 0 & 0 & 1 \end{pmatrix},$$

where ($\omega$, $\varphi$, $\kappa$) are the three rotation angles around the X, Y, and Z axes respectively. The point at coordinates (X, Y, Z) in the 3D point cloud is mapped and colorized with the pixel at (x, y) from the 2D ultrawide-angle image because of the above calculations.

Only the equidistant projection (610), and the equisolid-angle projection (630) types can properly model the Ricoh Theta ultrawide-angle lens. Accordingly, examples described herein provide equations that are applicable for those two projection models, however, it is understood that other types of projection models can be used without significant changes to the description provided herein. For example, the following are the calculations for the lens coefficient, m, for the equidistant and the equisolid-angle projection types for the ultrawide-angle lens:

$$\text{Equidistant projection coefficient:} m = -\frac{\tan(\theta)}{\theta}$$

$$\text{Equisolid-angle coefficient:} m = -\frac{\tan(\theta)}{2 \cdot \sin\left(\dfrac{\theta}{2}\right)}$$

It should be noted that in the case of the ultrawide-angle lens of the auxiliary image acquisition device 66, the range of $\theta$ is [0, $\pi$]. Among the trigonometric functions, only the inverse of cosine or the inverse of cotangent return the angle in the range of [0, $\pi$] (for inverse of cotangent is (0, $\pi$)). Accordingly, one or more embodiments use the inverse of cosine (acos) to determine the angle theta. Inverse of sine or inverse of tangent do not have this property. If they are used in the formulation, they cannot determine the sign and the value of $\theta$ for incoming rays with $\theta$ near to $\pi/2$ or larger than $\pi/2$ (FOV of near to $\pi$ or larger than $\pi$). FIG. 8 depicts a table 810 that provides the domains and ranges of various trigonometric functions. Based on these, the above described calculations of the camera coefficient m are based on using the following computation for the angle $\theta$:

$$\theta = \cos^{-1}\left(-\frac{U_Z}{\sqrt{U_X^2 + U_Y^2}}\right)$$

The above described calculation resolves the ambiguity of mapping the 3D point cloud captured by the laser scanner 20 to pixels from the 2D ultrawide-angle color image from the auxiliary image acquisition device 66 at near to or larger than zenith angle of 90°. By using the above techniques for calculating the angle $\theta$ embodiments described herein eliminate disambiguation of the sign and value of the angle $\theta$. Therefore, the coefficient m and the further calculations that use m are calculated correctly.

Typically, during mapping an image to a point cloud, straight lines in the real world (i.e., point cloud) are mapped to straight lines in the image generated by the rectilinear camera. However, most real optical systems introduce some undesirable effects, rendering the assumption of the rectilinear camera model inaccurate. In the case of the auxiliary image acquisition device 66, a radial distortion (also referred to as "radial barrel distortion") causes points on the image plane to be shifted from their ideal position along a radial axis from the principal point in the ultrawide-angle image plane. The visual effect of this displacement in ultrawide-angle optics is that the image has a higher resolution in the foveal areas, with the resolution decreasing nonlinearly toward the peripheral areas of the image.

Typically, the following set of equations are used to determine correction terms to image point coordinates. The equations use additional parameters for modeling the systemic errors of frame array cameras with rectilinear lenses.

$$\Delta x = dx_0 - \frac{\overline{x}}{c}dc - S_x\overline{x} + a\overline{y} + \overline{x}(r^2k_1 + r^4k_2 + r^6k_3) + (r^2 + 2\overline{x})p_1 + 2\overline{xy}p_2$$
$$\Delta y = dy_0 - \frac{\overline{y}}{c}dc + a\overline{x} + \overline{y}(r^2k_1 + r^4k_2 + r^6k_3) + 2\overline{xy}p_1 + (r^2 + 2\overline{y})p_2$$
(2)

Here, dc is a correction to camera constant c, $(dx_0, dy_0)$ represents corrections to the shift of principal point $(x_0, y_0)$, $(S_x, a)$ are affine transformation parameters: scale difference and shear, $k_1, k_2, k_3$ are parameters of radial lens distortion, and $p_1, p_2$ are parameters of decentering lens distortion.

It is known, that in modern electronic sensor manufacturing, the terms $(S_x, a)$ are negligible therefore, equations (2) consists of 8 camera calibration parameters which are determined through the process of camera self-calibration, which can be performed using known techniques.

It should be noted that the above description is one possible mapping of the point cloud with a 2D image that is captured using an ultrawide angle lens camera, however, any other mapping can be used without limiting aspects of the occlusion detection related technical solutions described herein. Additionally, while a 2D color image in the above example maps an ultrawide-angle image, rectilinear images can also be used for the mapping in other embodiments.

Figure 9:
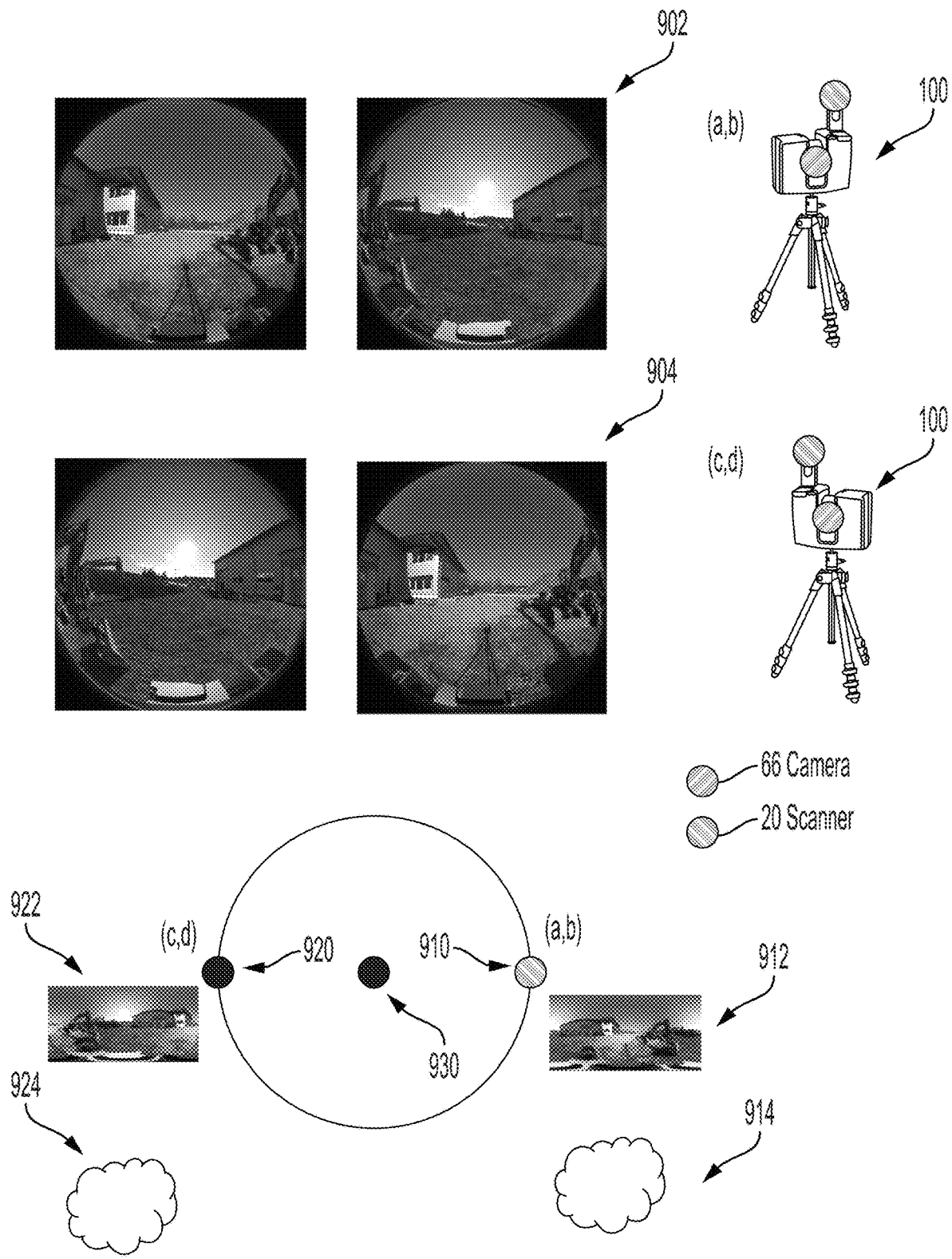
FIG. 9 depicts an example scenario for generating an artificial panorama image according to one or more embodiments.

FIG. 9 depicts an example scenario for generating an artificial panorama image according to one or more embodiments. In the depicted scenario, the measurement device 100 is placed at a first position 910 in the environment. A first pair of stereo-images (a, b) 912 is captured by the camera 66 from the first position 910. A corresponding 3D point cloud 914 is captured by the scanner 20 from the first position 910. Further, the measurement device 100 is moved to a second position 920. A second pair of stereo-images (c, d) 922 and a second 3D point cloud 924 are captured from the second position 920. It should be noted that although grayscale stereo images are shown, in one or more embodiments, color images can be captured by the camera 66. Further, while stereo images are shown, in some embodiments, non-stereo images can be captured.

The technical solutions provided herein address the technical challenge of producing a synthetic/artificial image from any arbitrary viewpoint (for example position 930) using the one or more images 912, 914, and the one or more 3D point clouds 922, 924. It should be noted that in other embodiments, additional images and 3D data can be available and used by applying the techniques described herein.

Figure 10:
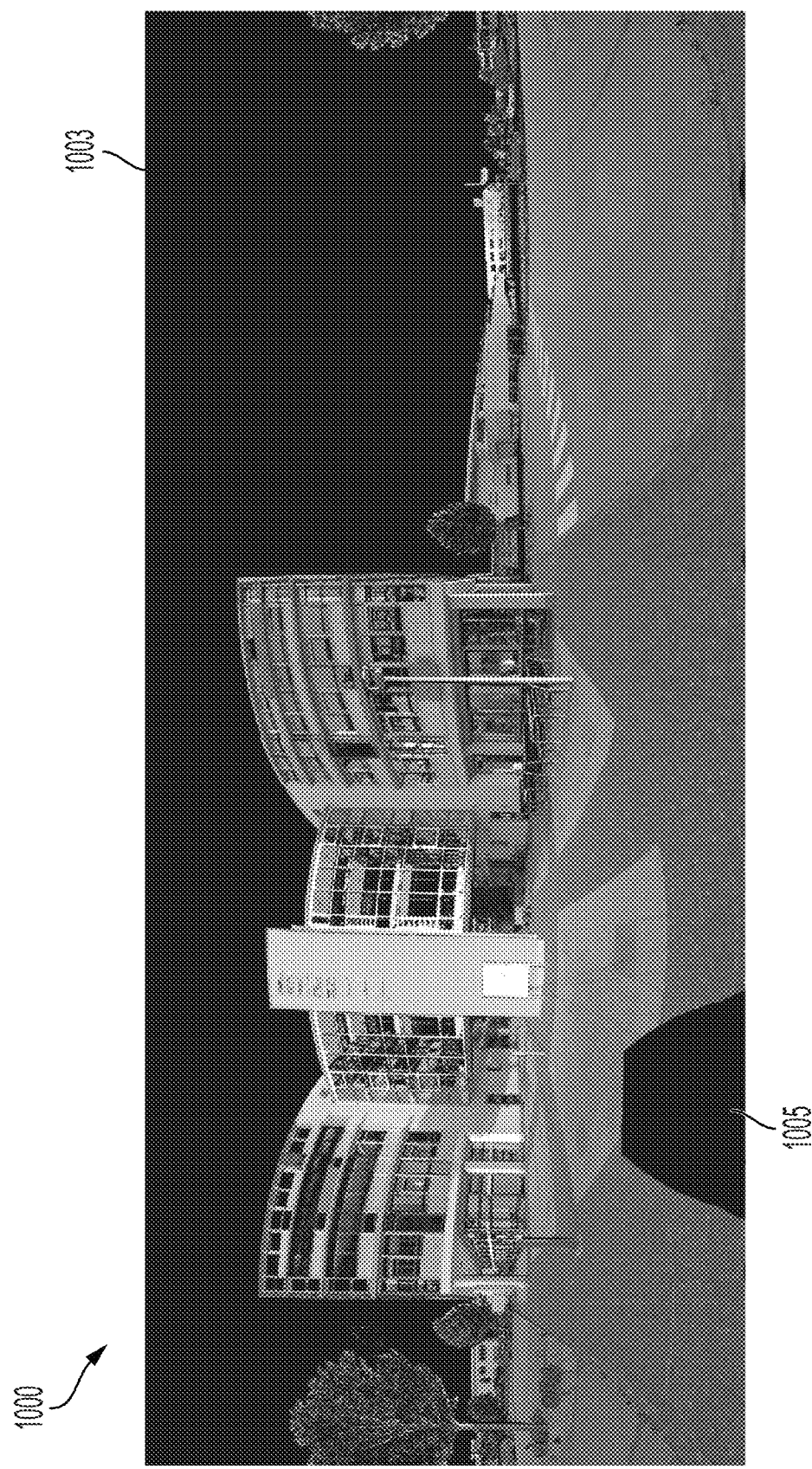
FIG. 10 depicts an artificially generated panorama.

FIG. 10 depicts an artificially generated panorama. The artificial image 1000 is generated using back projection only, i.e., using available colorization information from the data captured from the first position 910 and the second position 920. As can be seen, the image 1000 includes empty regions 1003, 1005, where data is absent either in the images 912, 922, or in the point clouds 914, 924. The empty regions can be a result of type II, type III, and/or type IV points. Type I points, as noted in table 1, are non-occluded points with color information available, and hence, can be represented in the artificial image 1000.

Figure 11:
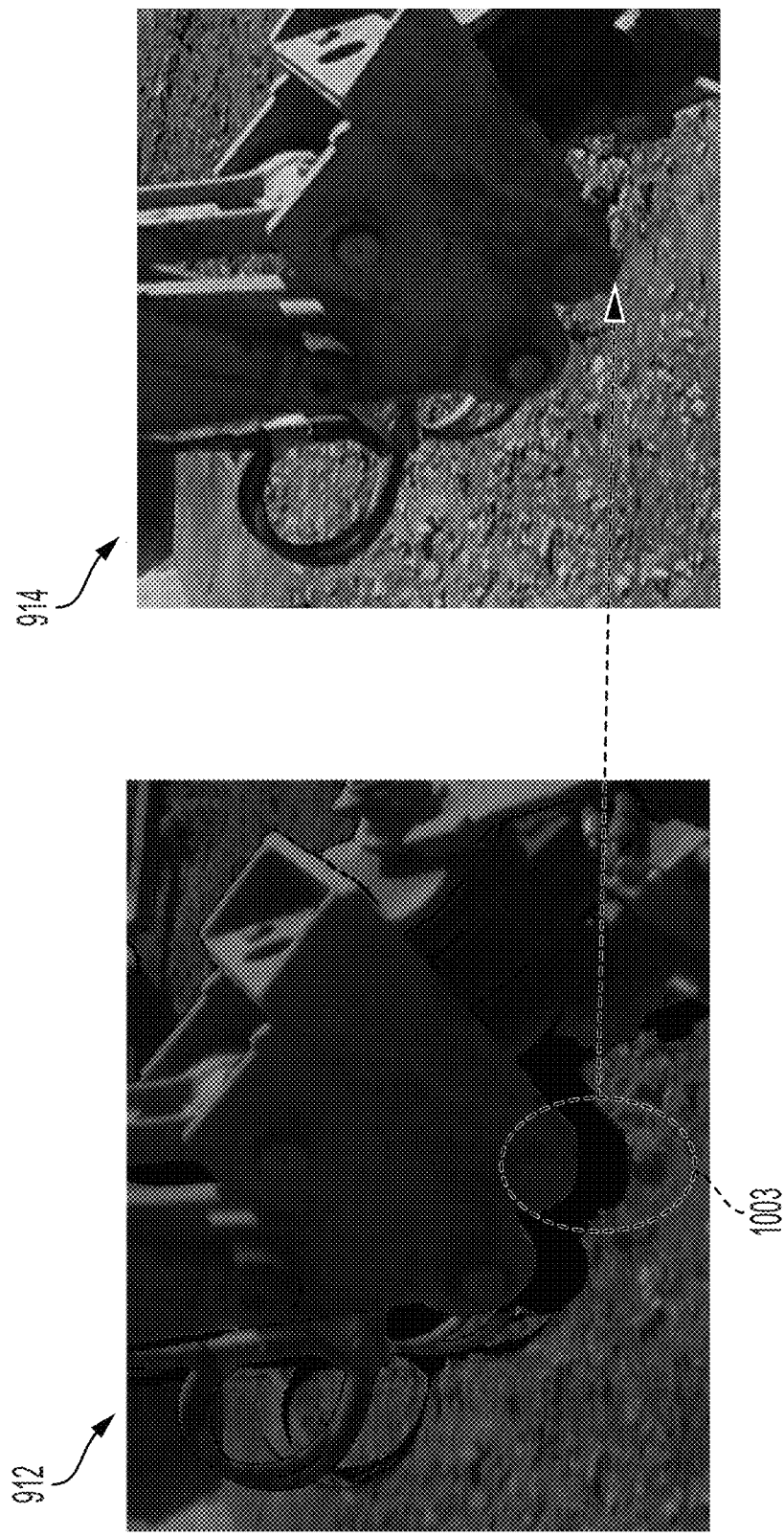
FIG. 11 depicts an example scenario of type II occlusion.

FIG. 11 depicts an example scenario of type II occlusion. The points in the region 1003 are only in the point cloud 914 because they are seen, and measured by the 3D scanner 20, and are not visible in the image 912 captured by the camera 66. The technical challenge for this case is that wrong colors (different from actual world) can be estimated by using techniques such as aggregating colors from the pixels in a vicinity of the point.

Figure 12:
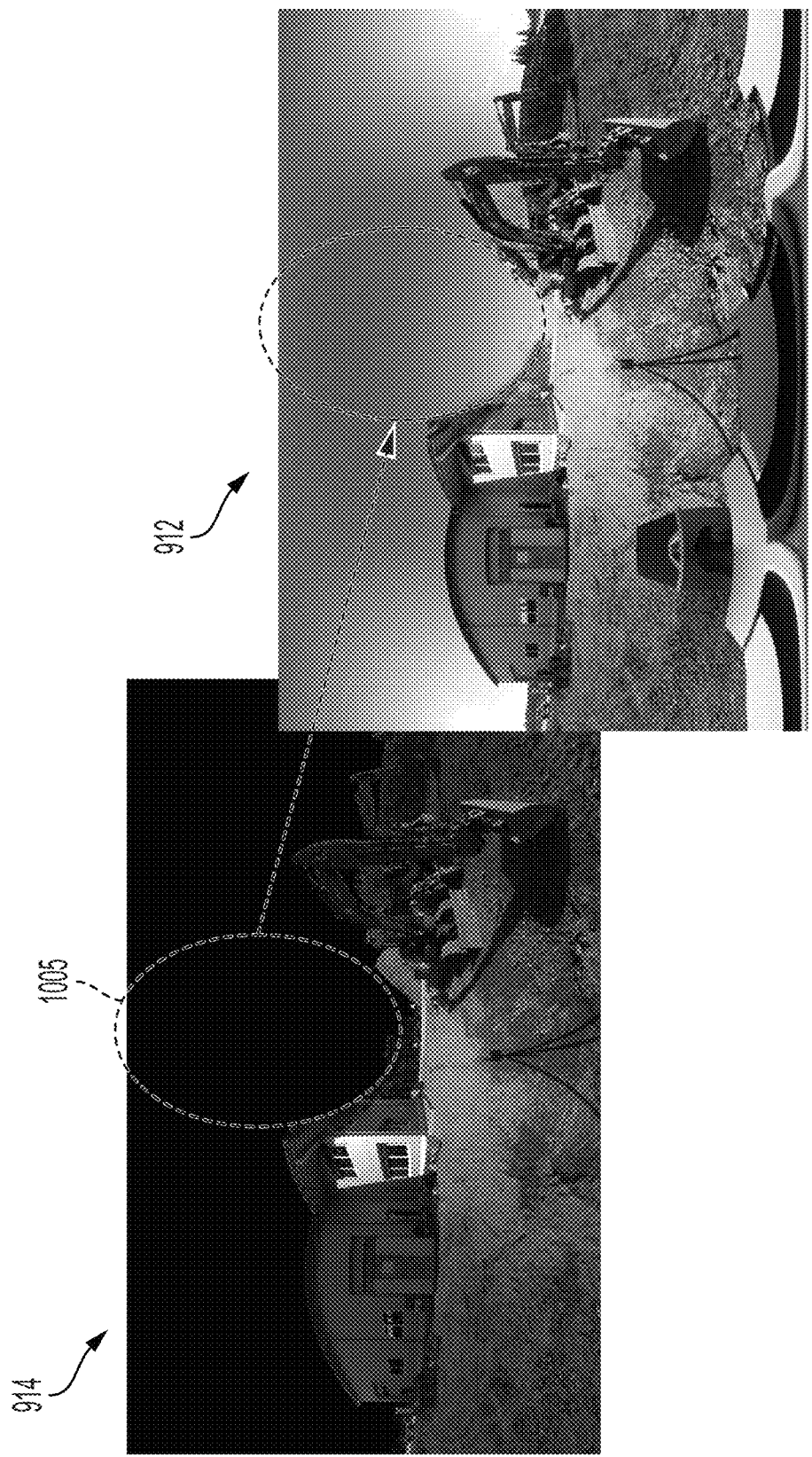
FIG. 12 depicts example scenario of type III occlusion.

In the case of Type III points, the actual real world color data is captured in the image 912 by the camera 66; however, what has to be estimated is how to map the color data from the captured images (912, 922) to the synthetic image 1000, because there is no correspondence in the 3D point cloud 914. FIG. 12 depicts example scenario of type III occlusion. As can be seen, points in the region 1005 are not in the 3D point cloud 914 visible from 3D scanner 20, but the actual colors are captured in the image 912 by the camera 66.

Figure 13:
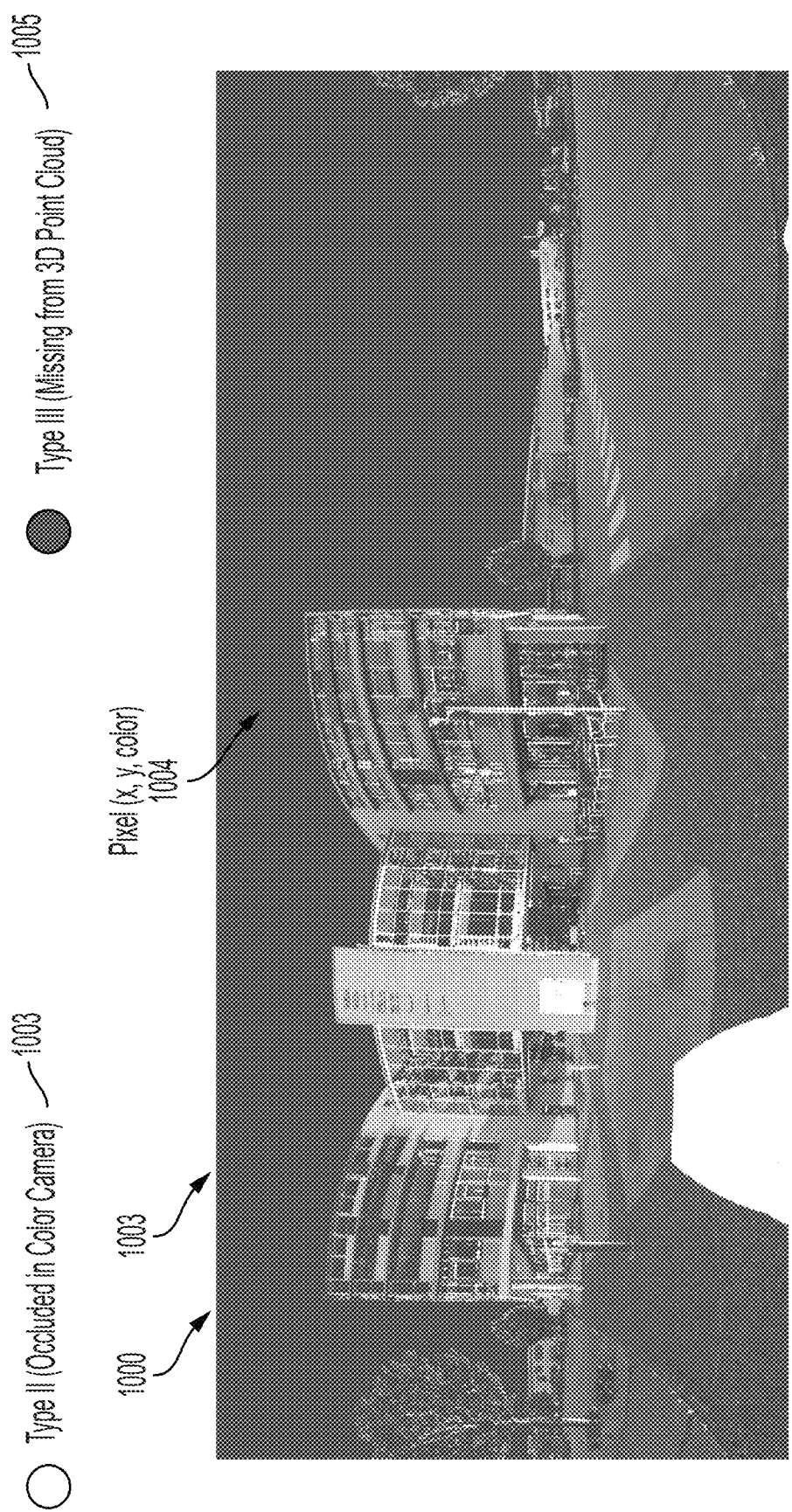
FIG. 13 depicts an artificially generated image with the type II points and type III points without accurate color information.

FIG. 13 depicts an artificially generated image 1000 with the type II points 1003 and type III points 1005 without accurate color information. Existing techniques that address the technical challenges to estimate the colors for points in an artificial image do not support multi-device data capture as provided by the 3D measurement device 100 with the scanner 20 and the camera 66. Instead, the existing techniques use 2D images only from different perspectives to fill occluded areas by recreating textures using pyramid-based in-painting, for example. Other techniques are also available, such as recreating missing texture in Laplacian. However, the existing techniques are not very accurate, and the technical solutions described herein provide an improved accuracy of estimated colors for the artificial image 1000.

Figure 14:
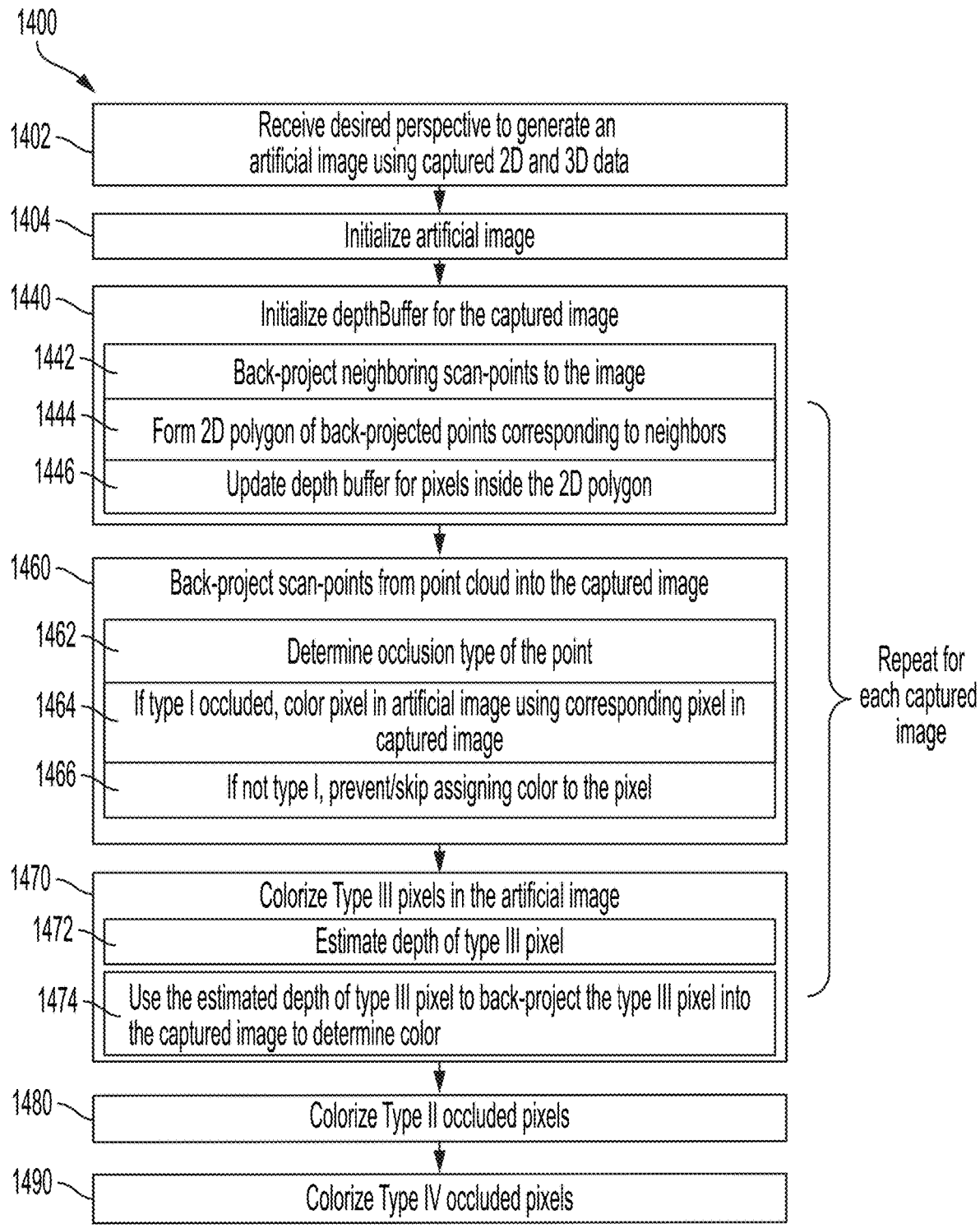
FIG. 14 depicts a flowchart of a method for generating an artificial image using captured 2D and 3D data from different perspectives according to one or more embodiments.

FIG. 14 depicts a flowchart of a method for generating an artificial image using captured 2D and 3D data from different perspectives according to one or more embodiments. FIG. 13 is used to depict operation of the method 1400. The method 1400 generates an artificial image 1000 of the environment from a desired perspective that is input by an operator. The desired perspective is received as input at block 1402. For example, an operator can input the desired perspective by providing a position and viewing vector/direction. The artificial image 1000 is to be generated using one or more of the 2D images (912, 922) and one or more of the 3D point clouds (914, 924) captured by the measurement device 100 from other perspectives. In the following description, the two camera images 912, 922 and a single point cloud 914 are used to generate the artificial image 1000. However, it is understood that additional images and/or point clouds can be used in other embodiments.

At block 1404, the artificial image 1000 is initialized with all the pixels set to an "empty" state, for example, a default color, such as black, white, gray, etc., which may be user configurable. If there is the possibility to provide alpha channel or weight for each pixel in the color space of the artificial image, the initial values are also denoted as fully transparent or with weight 0. The color for each pixel in the artificial image 1000 is determined as described further.

At block 1440, a depth buffer 1002 is initialized for each camera image 912, 922, being used to determine the colors of the pixels in the artificial image 1000. In this case two depth buffers 1002 are initialized, one corresponding to the image 912, and a second corresponding to the image 922. A depth buffer 1002 corresponding to an image (e.g., 912) has the same resolution as the image (912). A depth buffer 1002 is a two-dimensional array data structure in one or more embodiments. The depth buffer 1002 stores a corresponding depth for each pixel in the image 912. "Depth" is the distance between a 3D point (in the surrounding) and the camera 66. In some embodiments, the depth is stored using a floating-point value, i.e., a decimal value. The depth values in the depth buffer are initialized to a default value, e.g., "+infinity" (e.g., very large number) that is a predetermined value indicative of an "unknown depth," and updated as described further. A depth value can be computed for each scan-point in the 3D point cloud 922.

Figure 15:
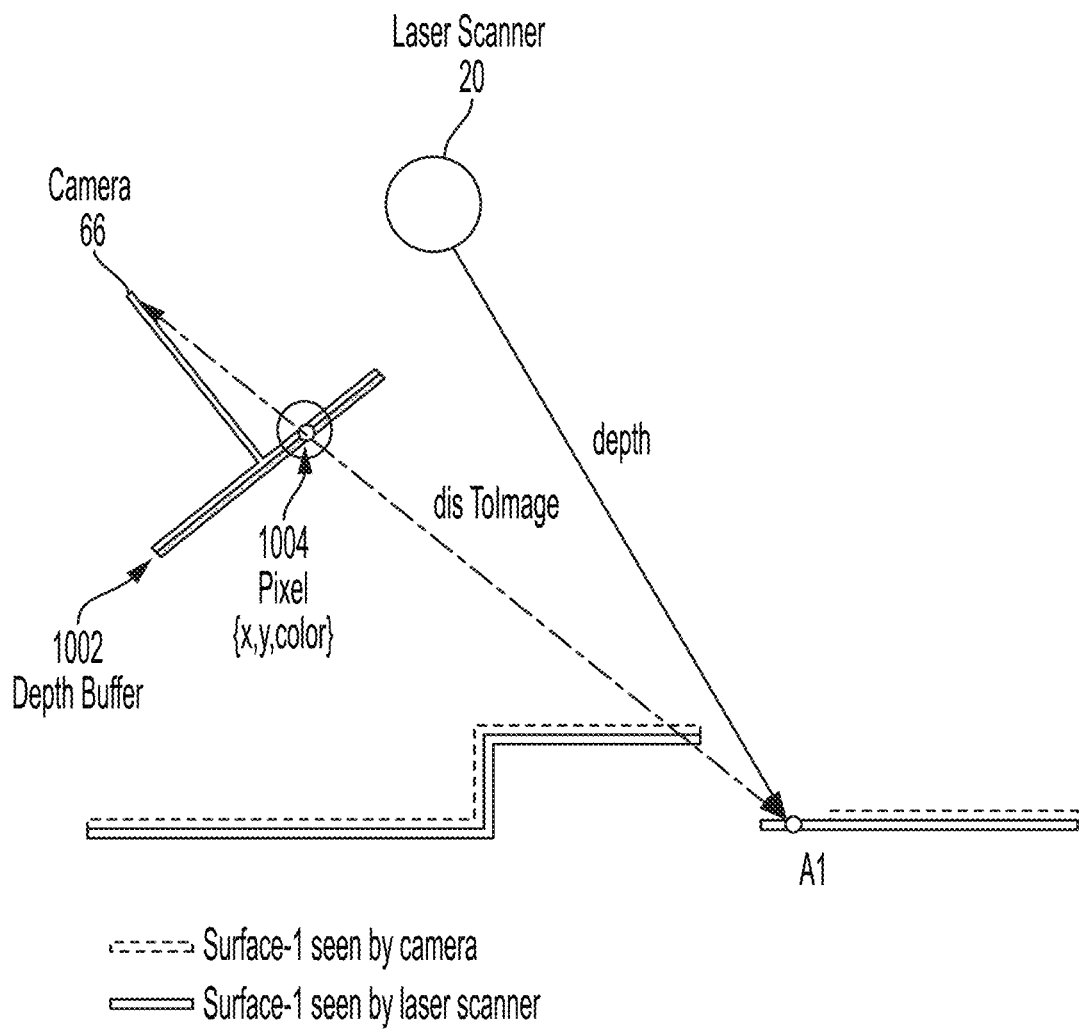
FIG. 15 depicts an example occlusion scenario.

At block 1442, to compute a depth value for a scan-point in the point cloud 922 corresponding to an object point A1, a set of neighboring 3D points are back-projected onto the camera image 912. FIG. 15 depicts distance ("disToImage" in FIG. 15), which is a distance between the scan-point A1 and the camera 66. For example, in FIG. 15, A1 corresponds to point (x, y) in the depthBuffer 1002 (and artificial image 1000, which is of the same dimensions). To determine depth value corresponding to point A1, a predetermined number of neighbors of A1 are back projected to the color image 912.

Figure 16:
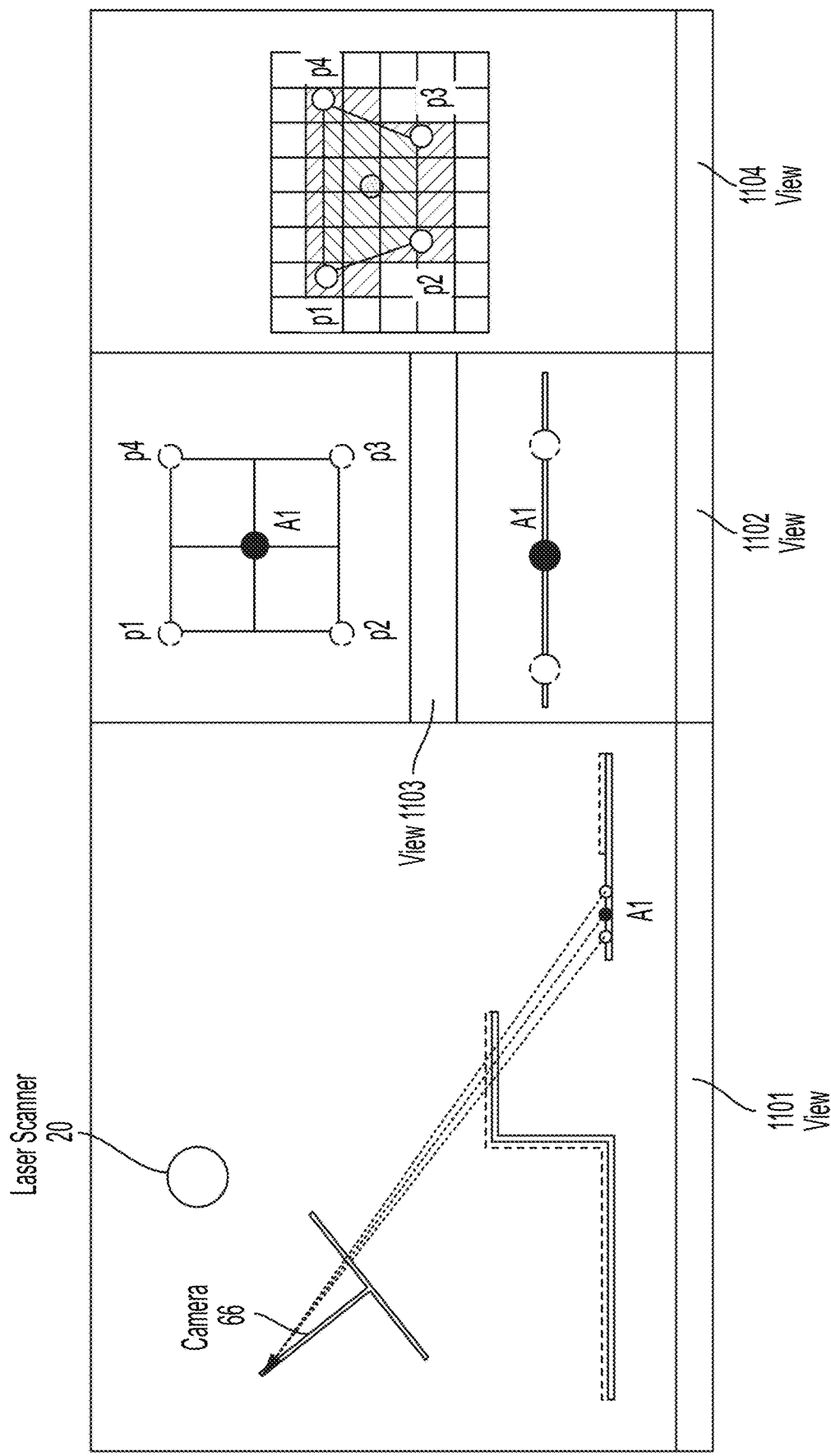
FIG. 16 depicts back projection according to one or more embodiments.

For example, in FIG. 16, four neighbor points of A1 (p1, p2, p3 and p4) are back-projected to the artificial image 1000 (see views 1103, 1104). In the example scenario of FIG. 16, view 1101 depicts the scan-point A1 which is being colorized, view 1102 depicts 1.5D representation of A1 and its two neighboring points, view 1103 depicts 2.5D representation of the neighboring grid points, and view 1104 depicts the back projected points corresponding to A1 and its four neighbors in image space and a 2D polygon region constructed from them.

At 1444, a 2D polygon is formed using the back-projected coordinates of p1, p2, p3, and p4. The values of depthBuffer 1002 for all pixels 1004 inside this polygon (view 1104) are updated at 1446 as:

depthBuffer[pixel in polygon]=min(disToImage, depthBuffer[pixel in polygon]).

At block 1460, each scan-point in the 3D point cloud 922 is back-projected into the captured image 912. Accordingly, the back-projected scan-point can be associated with {x, y, depth}. At 1462, based on the back-projection, it is determined if the back-projected point is occluded. If for the scan-point |depthBuffer[x, y]−disToImage|≤threshold, the point is deemed to be type I occluded. Accordingly, at 1464 for type I occluded points, the color of the pixel (x, y) from the image 912 is used to color the pixel (x, y) 1004 in the artificial image 1000. Instead, at block 1466, if the point is not type I occluded, corresponding pixel 1004 in the artificial image 1000 is skipped (i.e., not assigned a color) at this time, because an occlusion type (II/III/IV) has to be determined for that pixel 1004.

At block 1470, type III pixels in the artificial image 1000 are colorized using the captured image 912. In some embodiments, a list of pixels 1004 in the artificial image 1000 onto which none of the scan-points in the 3D point cloud 922 are back-projected is determined. In other words, if none of the scan-points in the 3D point cloud 922 back-projects onto a pixel 1004 of the artificial image 1000, that pixel 1004 is noted on the list of pixels 1004 that are candidates for type III colorization.

At block 1472, for each pixel 1004 ($p_s$(x, y)) on the list of candidates for type III colorization (list of candidates), a mapping M is estimated between the pixel 1004 ($p_s$) and a corresponding pixel $p_o$(x,y) in the captured image 912. M: $p_s \rightarrow p_o$, such that for each empty pixel 1004 in the artificial image 1000, M is used to get pixel coordinates in the captured image 912 and assign color. As noted herein, Type III points have actual real world data captured by the camera 66, but no corresponding 3D scan-point in the point clouds (922, 924). If parallax between the position from which the artificial image 1000 is requested and the position from which the captured image 912 is recorded was negligible, the mapping could simply be a space vector for forward-projecting (or back-projecting) $p_s$ to $p_o$. However, in general the parallax may not negligible in most cases. Hence, when there is non-negligible parallax, a more accurate estimate of 3D position of the pixels 1004 is required to back-project into the captured image 912.

Figure 17:
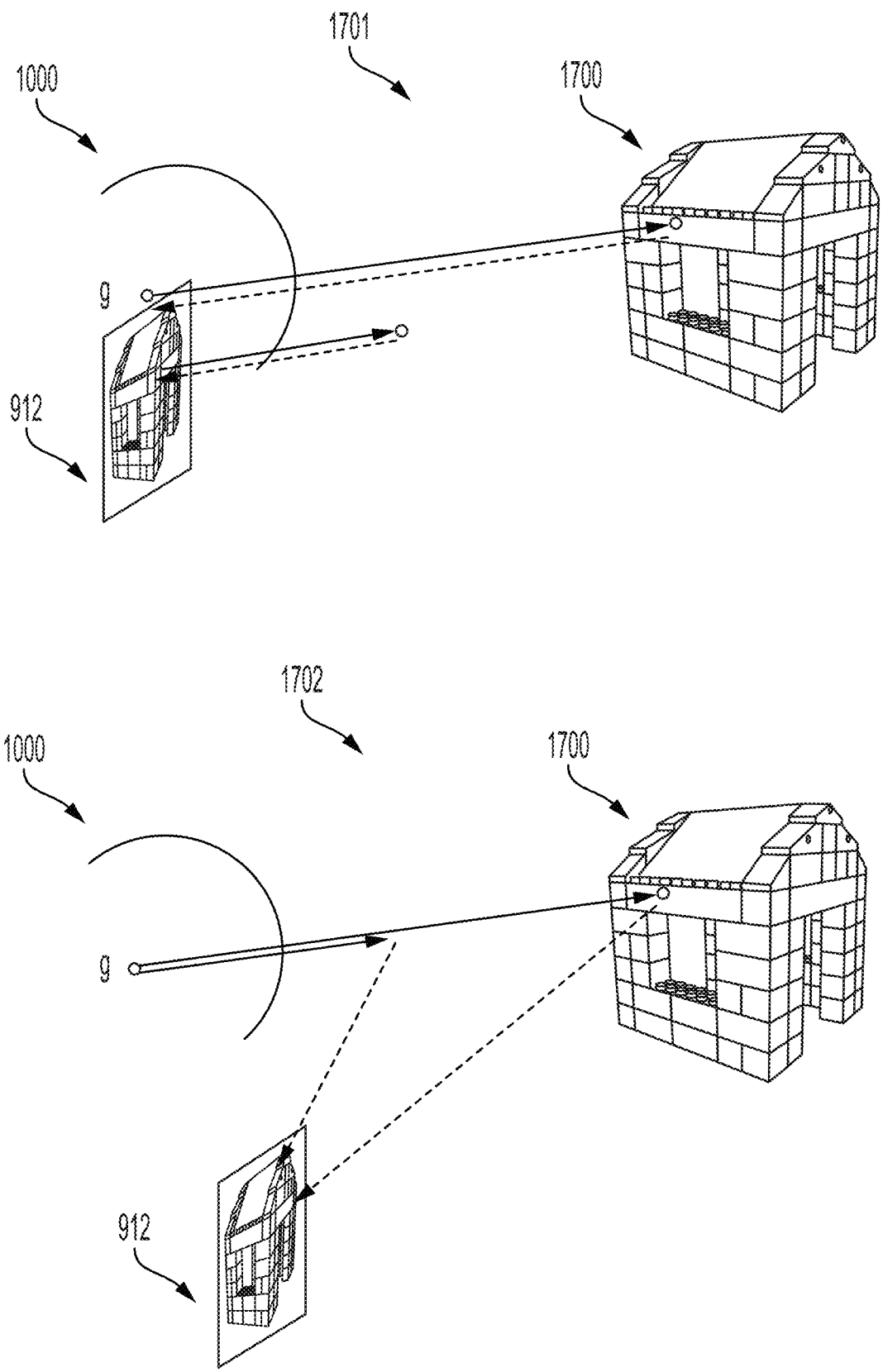
FIG. 17 depicts two example scenarios for generating an artificial image according to one or more embodiments.

FIG. 17 depicts two example scenarios for generating an artificial image, a first scenario 1701 in which the parallax is negligible, and a second scenario 1702 in which the parallax is not negligible. In both scenarios 1701, 1702, the captured image 912 represents a color image of surroundings 1700, and the artificial image 1000 is requested from position 'g'. In the scenario 1701, the mapping M can simply be a vector projection, whereas in the case of the positioning in the scenario 1702, the mapping M has to be estimated more rigorously because the corresponding 3D data (in point cloud 922) may be missing.

Figure 18:
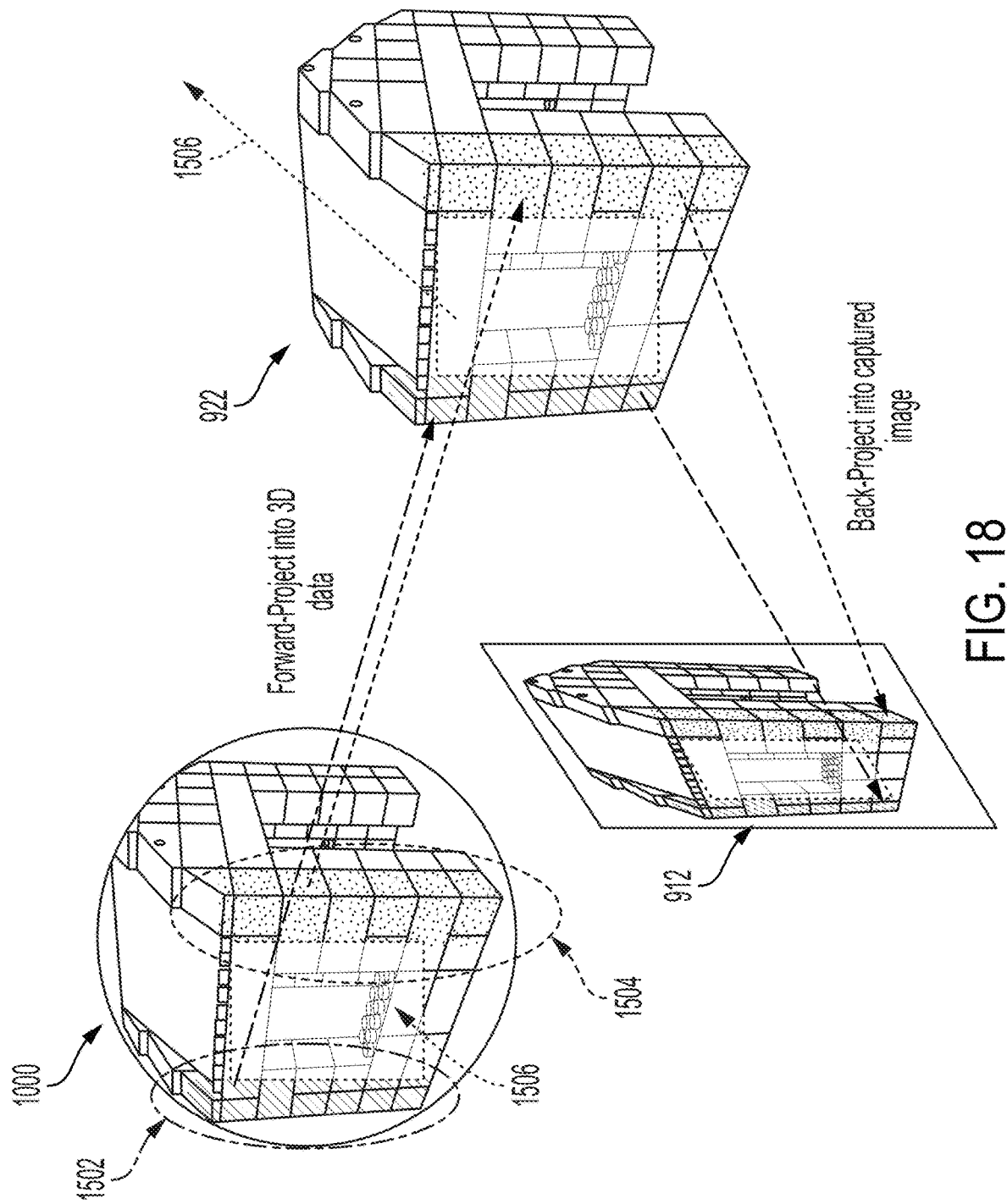
FIG. 18 depicts an example scenario where some pixels of an artificial image are colorized using vector projection as the mapping according to one or more embodiments.

FIG. 18 depicts an example scenario where some pixels 1004 can be colorized using vector projection as the mapping M, while other pixels 1004 cannot be (because of missing 3D data). The pixels 1004 in a first group 1502 and a second group 1504 can be colorized using vector projections. Particularly, a pixel ($p_s$) 1004 in the first group 1502 or in the second group 1504 can be forward-projected onto the point cloud 922 to determine a corresponding scan-point, and the corresponding scan-point can in turn be back-projected into the captured image 912 to identify a corresponding pixel ($p_o$). The color of the pixel $p_o$ can be used to colorize the pixel 1004 ($p_s$). A third group 1506 of pixels 1004 from the artificial image 1000 are type III. The third group 1506 of pixels 1004 correspond to scan-points that the 3D scanner 30 could not capture 3D coordinates for in the 3D point cloud 922. Accordingly, the vector projections that could be used for the first group 1502 and the second group 1504 cannot be used for the third group 1506 of pixels 1004 for colorization.

In one or more embodiments, for a pixel 1004 ($p_s$) in the third group 1506, the corresponding scan-point is determined using interpolation based on the first group 1802 and the second group 1504. The interpolated scan-point is then used for back-projecting into the captured image 912 to determine the pixel ($p_o$), and in turn a color for the pixel 1004 ($p_s$).

Referring to FIG. 14, at block 1472, for a $p_s$(x, y)) on the list of candidates of type III occlusion, a depth is estimated. The depth can be estimated using one of several techniques. In one or more embodiments, a Laplacian pyramid based technique is used to estimate the depth of pixel 1004 in the artificial image 1000.

Figure 19A:
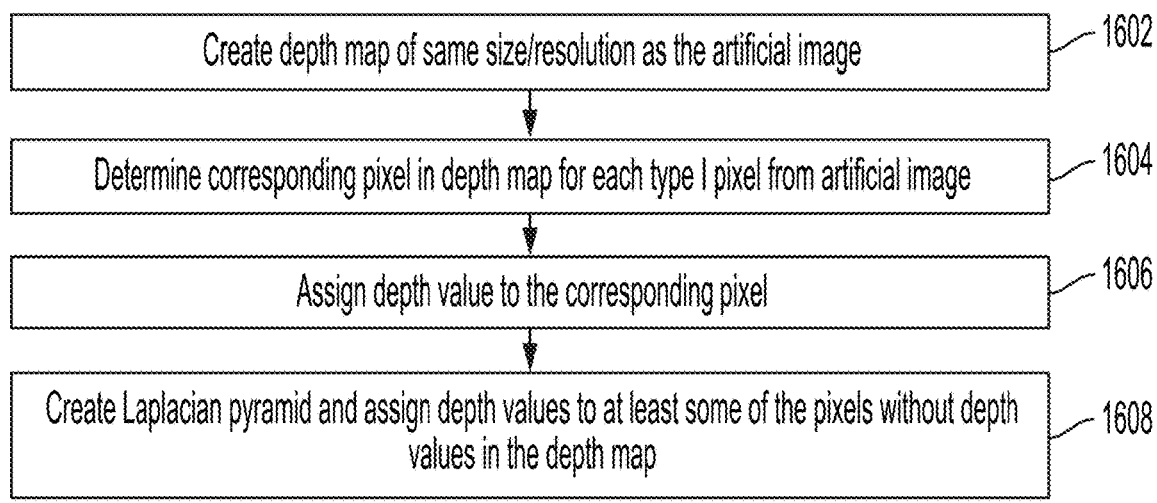
FIG. 19A depicts a flowchart of a Laplacian pyramid based method for estimating depth of a pixel in an artificial image according to one or more embodiments.

FIG. 19A depicts a flowchart of a Laplacian pyramid based method for estimating depth of the pixel 1004. At block 1602 of the method 1600, a 2D depth map d of the same size and resolution as the artificial image 1000 is created.

At block 1604, for each type I pixel $p_{o-I}$ 1004 in the artificial image 1000, a corresponding pixel $p_{s-I}$ is determined. The corresponding pixel is at the same position as $p_{o-I}$, i.e., if $p_{o-I}$ is at position (row, col) in the artificial image, $p_{s-I}$ is at the position (row, col) in the depth map d.

At block 1606, the corresponding pixel in the 2D depth map is assigned a depth value $d_{pos}$. In some embodiments, the depth value $d_{pos}$ stored at the corresponding pixel $p_{s-I}$ is the set of 3D coordinates of the scan-point to which the pixel 1004 $p_{o-I}$ is forward-projected onto in the point cloud 922. Alternatively, the depth value $d_{pos}$ stored at the corresponding pixel $p_{s-I}$ is the depth value of the scan-point computed as a floating point value (described herein). At this time, some of the pixels in the 2D depth map d will be assigned depth values (those corresponding to type I occlusion pixels from the artificial image 1000), while the others will not be assigned any depth values.

At block 1608, Laplacian pyramid is created to fill the holes in the 2D depth map by d=expand(reduce(d)). The Laplacian pyramid can be created using one or more known, or later developed techniques. The Laplacian pyramid blends the depth values of the type I pixels to fill the unfilled depth values in the depth map d. It should be noted that there may be pixels in d still without a depth estimate, and for such pixels a depth value of ∞ is assigned.

Referring again to the method 1400 of FIG. 14, at block 1474, the depth values determined in this manner (method 1600) for the type III pixels 1004 are used to back-project into the captured image 912 and determine the color for the pixel 1004. The back-projection for the type III pixel is possible because it is now assigned (x, y, depthValue).

Figure 19B:
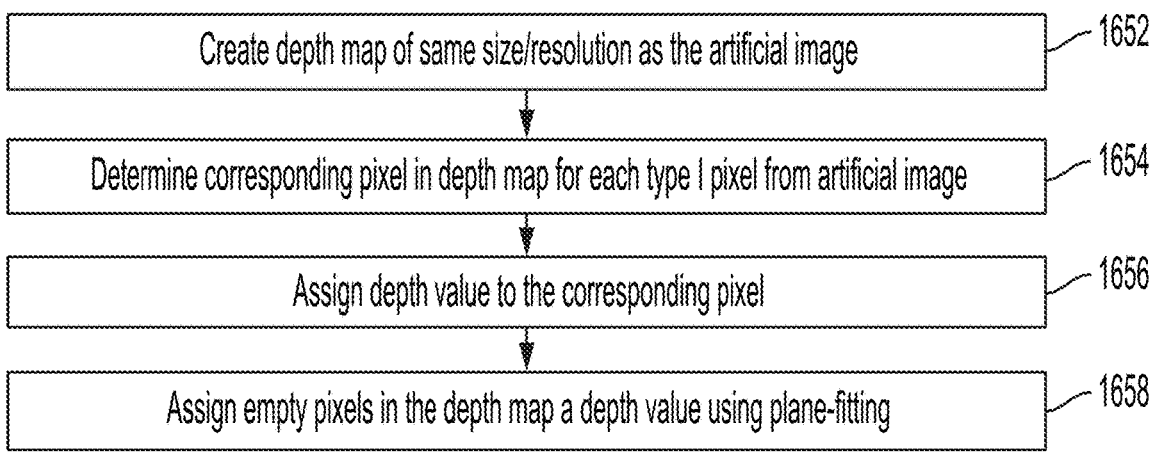
FIG. 19B depicts a flowchart of a plane-fitting based method for estimating depth of a pixel in an artificial image according to one or more embodiments.

FIG. 19B depicts a flowchart of a plane-fitting based method for estimating depth of the pixel 1004. The plane-fitting method 1650 is an alternative to the Laplacian pyramid based method 1600 from FIG. 19A. At block 1652 of the method 1650, a 2D depth map d of the same size and resolution as the artificial image 1000 is created.

At block 1654, for each type I pixel $p_{o-I}$ 1004 in the artificial image 1000, a corresponding pixel $p_{s-I}$ is determined. The corresponding pixel is at the same position as $p_{o-I}$, i.e., if $p_{o-I}$ is at position (row, col) in the artificial image, $p_{s-I}$ is at the position (row, col) in the depth map d.

At block 1656, the corresponding pixel in the 2D depth map is assigned a depth value $d_{pos}$. In some embodiments, the depth value $d_{pos}$ stored at the corresponding pixel $p_{s-I}$ is the set of 3D coordinates of the scan-point to which the pixel 1004 $p_{o-I}$ is forward-projected onto in the point cloud 922.

At block 1658, for each empty pixel p (to which a depth value is not assigned above) in the depth map d, the depth value is determined using plane-fitting. As part of the plane-fitting, Define a window w is determined around p (e.g., with window size of 10 pixels). The window w represents the surrounding predetermined number of pixels of p. If at least a predetermined threshold number (e.g., 6) of points exist in w that have projected coordinates (i.e., a depth value assigned): a plane P is fit over the points in w. The coordinates of p are subsequently transformed using the plane P into coordinates of the captured image 912 using known techniques (e.g., texture mapping). If the window w does not contain the predetermined number of points with projected coordinates (i.e., depth value assigned), p is assigned the default depth of ∞.

Referring again to the method 1400 of FIG. 14, at block 1474, the depth values determined in this manner (method 1650) for the type III pixels 1004 are used to back-project into the captured image 912 and determine the color for the pixel 1004. The back-projection for the type III pixel is possible because it is now assigned (x, y, depthValue).

At block 1474, regardless of which method is used to determine the estimated depth values of the type III pixels 1004, the estimated depth (from depth map d) is compared with the depth buffer (from 1440). If the depthBuffer(x, y) greater than or equal to the estimated depth value d(x, y), the $p_s$(x, y) in the artificial image 1000 is assigned a color based on $p_o$(x, y) from the captured image 912. If the above condition is not met, i.e., the estimated depth value exceeds the corresponding value in the depthBuffer, the pixel 1004 is not colored at this time. The pixel 1004 may be colorized using another captured image (e.g., 914) in a subsequent iteration.

The operations of depthbuffer initialization (1440), back-projection (1460) of scan-points using the depthbuffer 1002, and type III pixel colorization (1470), are performed iteratively or in parallel for each captured image 912, 914 (or more).

At this point, several pixels 1004 in the artificial image 1000 are colorized, particularly those that are categorized as type I and type III occluded. Further, at block 1480, the type II pixels are colorized by performing a pyramid-based inpainting.

At 1490, if the pixel 1004 is of Type IV, the color of the pixel is determined based on the colors of the surrounding pixels (in a predetermined vicinity) from the artificial image 1000 itself using known 2D inpainting techniques. For example, using the pixels in the predetermined surrounding area of the pixel 1004, missing texture recreation can be performed using Laplacian transformation. Other known, or later-developed techniques can also be used in other embodiments to determine the color of Type IV occluded pixel 1004.

Figure 20:
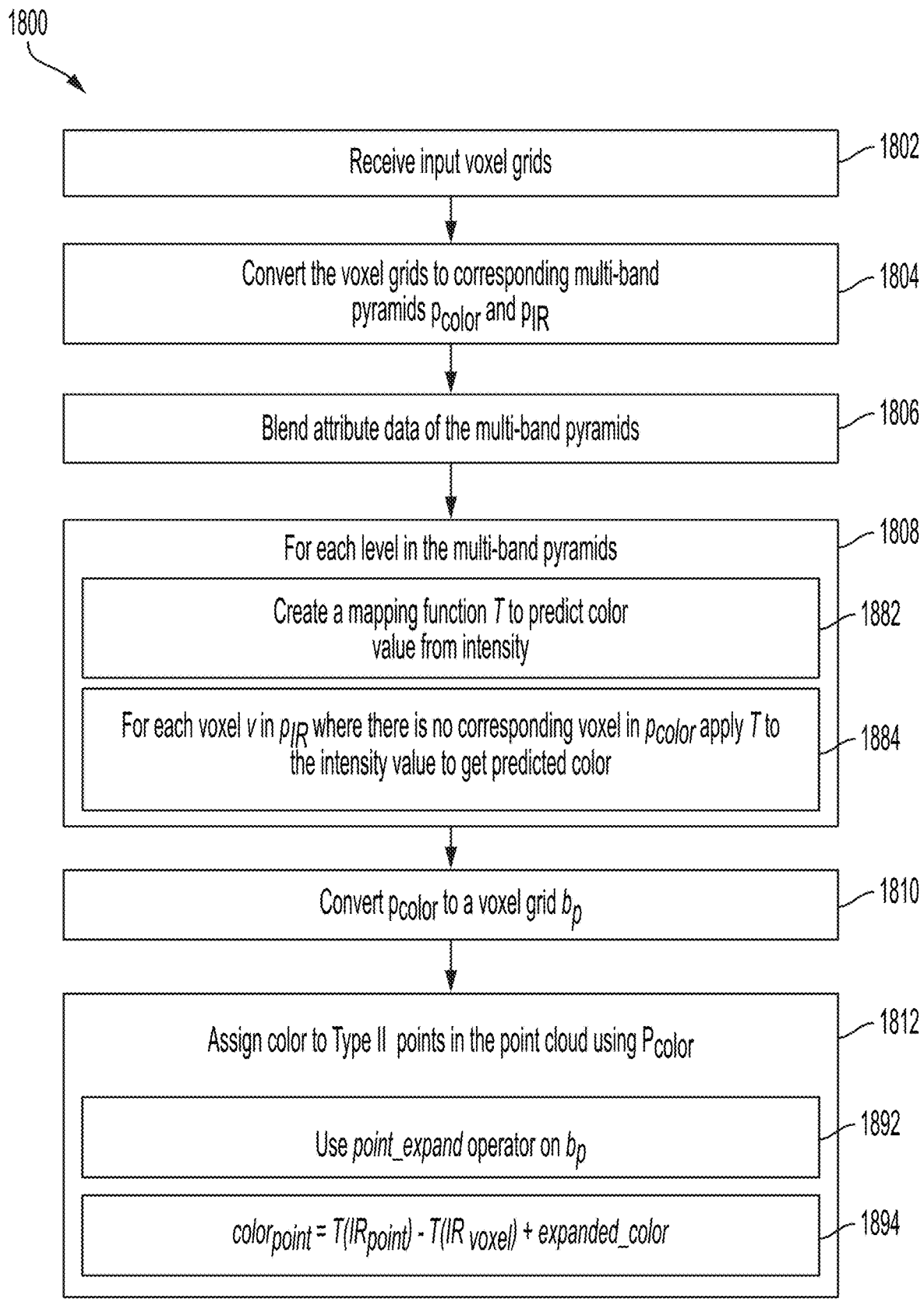
FIG. 20 depicts a flowchart of a method that uses voxel-based 3D pyramids to determine a color of a pixel according to one or more embodiments.

Referring now to determining the color of the pixel 1004 for Type II occlusion (at 1480), FIG. 20 depicts a flowchart of a method 1800 that uses voxel-based 3D pyramids to determine the color of the pixel 1004. As noted in Table 1, for the pixel 1004 of Type II, a corresponding 3D scan-point is available in the 3D point clouds 914, 924, but color data is not available in the images 912, 922.

The method 1800 includes, at block 1802, creating two multi-band pyramids ($p_{IR}$ and $p_{color}$) for the corresponding scan-point. A "multi-band pyramid" is a bandpass representation of the captured 3D data. A multi-band pyramid is made of multiple detail levels, each level storing attribute data, such as color or intensity at a different resolution. In other words, each level of pyramid stores part of attribute data that is at a specific spatial frequency band. In the context of this application "frequency" refers to spatial frequency unless otherwise specified, and spatial frequency is the amount of change to attribute data between points in 3D space (and not the light wave frequency of RGB color rays). $p_{IR}$ is multi-band pyramid created with laser intensity values for the scan-point and $p_{color}$ is multi-band pyramid created with color values for the scan-point. Both, $p_{IR}$ and $p_{color}$ are in the same coordinate system. Further, the two pyramids, tessellate the same 3D space, have the same number of levels, with each corresponding level having the same resolution.

Figure 21:
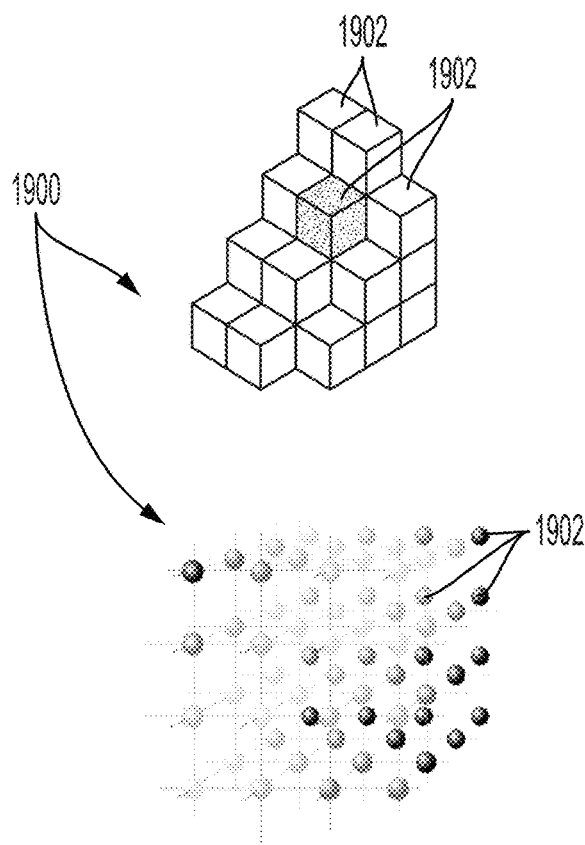
FIG. 21 depicts an example voxel grid according to one or more embodiments.

FIG. 21 depicts an example voxel grid 1900. The voxel grid 1900 includes a series of voxels 1902 in a stack, with a single voxel 1902 shaded. A voxel grid 1900 is a grid in three-dimensional space that tessellates the Euclidean 3D space into voxels 1902. As with pixels in a 2D bitmap, each voxel 1902 represents a unit cube and can be addressed by a 3D index (i, j, k). The position (3D coordinates) of a voxel 1902 in 3D space can be computed from its index and the coordinates of the bounding cube around the area that is represented by the voxel grid 1900. Each voxel 1902 with index (i, j, k) is assigned a color value when generating $p_{color}$ and an intensity value when generating $p_{IR}$. In some embodiments, the intensity value comes from laser scanner and is a floating-point value (usually between 0 and 1). The color value usually has three components (Red, Green and Blue) where for each component we keep a floating-point value (between 0 and 1). An appropriate data structure is used to store the attribute values for the voxel grid 1900. In one or more embodiments, the data structures are stored in contiguous memory, while in other embodiments, the data structures are stored sparsely in computer-readable memory. It should be noted that point clouds 914, 924, can be converted into corresponding voxel grids 1900 in one or more embodiments, and the resulting voxel grids 1900 can be converted back into the original point clouds 914, 924.

The attribute values assigned to each voxel 1902 can be expressed using any protocol, for example, in any color system that satisfies at least the following requirements. The attribute values have to be vectors or scalar floating-point values that can be stored in the computer-readable memory. Arithmetic operators such as addition, subtraction, and division by a scalar factor can be performed using the attribute values. Further, the attribute values use a linear range of values. For example, for RGB color, a vector of 3 floating-point values represents red, green, and blue color channels, with a pre-defined linear range (for example, between 0 to 255, or between 0 to 1). Similarly, for intensity value, a vector or a scalar value represents the intensity captured by the scanner (for example, between 0 to 255, or between 0 to 1).

Figure 22:
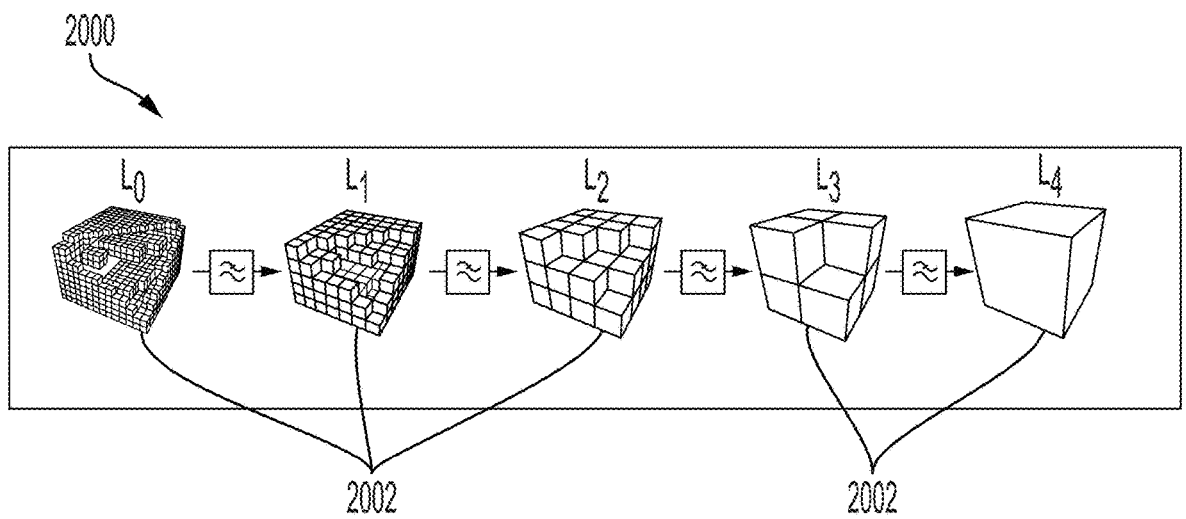
FIG. 22 depicts a multi-band pyramid according to one or more embodiments.

The method 1800 includes, at block 1804, creating a multi-band pyramid for the input voxel grid 1900. FIG. 22 depicts a multi-band pyramid 2000 according to one or more embodiments. A multi-band pyramid is a collection of multiple levels 2002, where each level 2002 is stored as a voxel grid. Accordingly, in the context of a multi-band pyramid, "voxel grid" and "level" can be used interchangeably. Therefore, we can define a multi-band pyramid 2000 as a collection of the voxel grids $L_0, L_1, \ldots L_n$ 2002 where, 1) all levels $L_0, L_1, \ldots L_n$ tesselate the same area in 3D space (that is, they all have the same bounding cube); and 2) each level $L_i$ has a predetermined fraction of the resolution of the previous level ($L_{i-1}$). For example, in the depicted example, the predetermined fraction is half, i.e., if level $L_0$ has a resolution of (256×256×256), then $L_1$ has the resolution (128×128×128), $L_2$ will be (64×64×64), and so forth. Multi-band pyramids are bandpass, that is, each level only stores the part of data that is unique to that resolution and level of detail.

Figure 23:
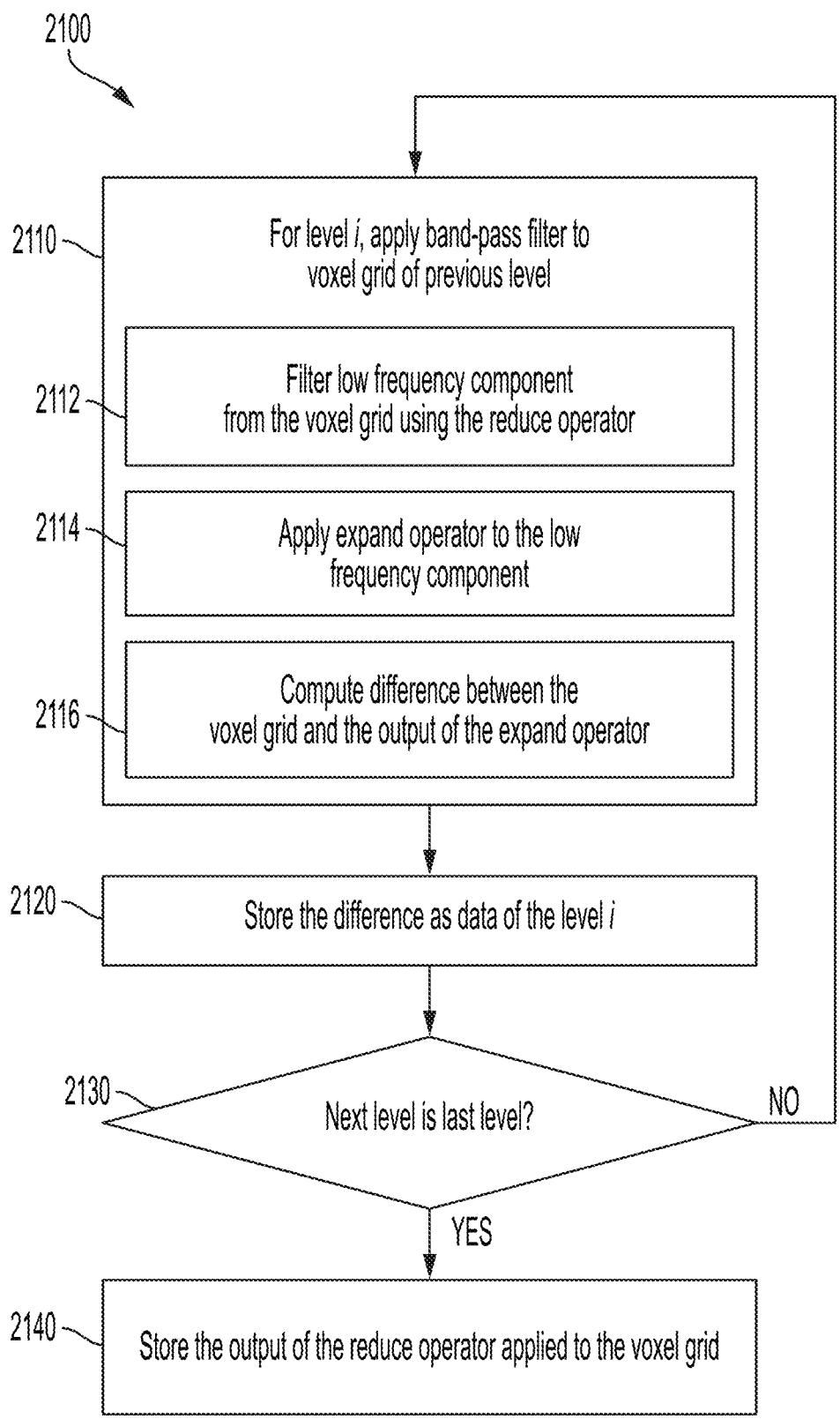
FIG. 23 depicts a flowchart of a method for converting a voxel grid to a multi-band pyramid according to one or more embodiments.

An algorithm that forms the multi-band pyramid 2000 by subjecting an input voxel grid 1900 to repeated smoothing and subsampling is described further herein (FIG. 23). Each iteration of this process results in a smaller voxel grid 2002 with increased smoothing, but with decreased spatial sampling density (that is, decreased resolution). In other words, each iteration can be thought of as computing a 3D difference of Gaussians (DoG) (see FIG. 22). This way, the conversion of the voxel grid 1900 to the multi-band pyramid 2000 can be thought of as a bandpass filter that stores each frequency band as a separate level 2002 of the pyramid 2000 (see FIG. 22).

During the conversion, the operators used for the conversion (and reverse conversion), i.e., "smoothing and subsampling" (reduce operator) and "smoothing and upsampling" (expand operator), are variations of the same smooth operator, which is described further. The difference is that for the two different conversions, the resolution of input and output voxel grids are switched.

Table 2 provides an algorithm for the smooth operator.

TABLE 2

Smooth Operator

Let I be the input voxel grid and O the output voxel grid.
For each voxel vo in O, assign a color value using as follows:
 $\text{sum}_w = 0$
 $\text{sum}_{attr} = (0, 0, 0)$
 For each voxel vi in I:
  w = weight (vi)
  $\text{sum}_w$ += w
  $\text{sum}_{attr}$ += w * attribute (vi)
 Finally, output voxel is constructed by the weighted averaging
  color (vo) = $\text{sum}_{attr}/\text{sum}_w$
Here, the weight function is a function of the Euclidean distance between center of voxels vi and vo. For example, in an embodiment, the following Gaussian function can be used:

$$\text{weight}(vi) = \exp\left(-\frac{\text{distance}(vi, vo)^2}{2\sigma^2}\right) \quad (1)$$

The σ parameter of the Gaussian function controls the bandwidth of this low-pass filter. It controls the amount of detail that is preserved in each level of pyramid. Choosing the right value for this parameter is application specific. In an embodiment, σ = 1.

The reduce operator is an instance of the smooth operator where the input voxel grid has a higher resolution than the output voxel grid. For example, the voxel grid in $L_0$ can have twice the resolution of the voxel grid in $L_1$. Table 3 provides an algorithm for the reduce operator that uses the smooth operator. The reduce operator can be considered to be a low pass filter that filters data from the input voxel grid when creating the output voxel grid.

TABLE 3

Reduce Operator

Let I be the input voxel grid with a resolution of (m, n, p)
Create an empty voxel grid O with a resolution of (m/2, n/2, p/2)
O = smooth (I)

Converse to the reduce operator, the expand operator is an instance of the smooth operator where the input voxel grid has a lower resolution than that of the output voxel grid. For example, the voxel grid in $L_1$ can have half the resolution of the voxel grid in $L_0$. An algorithm to implement the expand operator is provided in table 4. When applied to the output of the reduce operator, expand tries to recreate the original resolution voxel grid from the output of the low pass filter. Because the output of the reduce operator no longer contains high-frequency details, the expand operator can only recreate the input of reduce partially. By finding the difference between an original voxel grid and the expanded result of its low-pass filter, attribute value for the specific frequency band that was removed by the low-pass filter can be determined. Therefore, attribute data, such as the intensity, color, for a given voxel grid V can be separated into low- and high-frequency bands by:

low frequency = reduce (V)　　(2)

high frequency = V − expand (low frequency)

Further, with a Gaussian weight function like the one given in Equation 1, when distance is above a certain threshold, the value of weight becomes mathematically negligible. Therefore, the implementation of the expand and reduce operators can be optimized by reducing the search area for calculating the color of each output voxel to only the neighborhood of voxels in the input voxel grid that have non-negligible weights. Accordingly, the expand and reduce operators can be effectively approximated by 3D convolutions of a Gaussian kernel and the input voxel grid.

FIG. 23 depicts a flowchart of a method for converting a voxel grid to a multi-band pyramid according to one or more embodiments. The depicted method 2100 depicts converting an input voxel grid (VI) 1900 into an output multi-band pyramid 2000. However, it is understood that in one or more embodiments, multiple input voxel grids can be converted into corresponding multi-band pyramids in conjunction. The multi-band pyramid 2000 that is output includes multiple levels 2002, and each level is a voxel grid ($L_0, L_1, \ldots L_{an}$. All voxel grids $L_0, L_1, \ldots L_n$ tessellate the same area in 3D space as VI 1900 (that is, the voxel grids 2002 all have the same bounding cube as VI).

To create the multi-band pyramid 2000, at block 2110, for creating a level L of the multi-band pyramid 2000, the bandpass filter, from equation (2), is applied to the low-frequency output of the previous iteration, i.e., $L_{i-1}$. Applying the bandpass filter includes applying the reduce operator to the voxel grid 2002 from the previous level (2112) and applying the expand operator to the output of the reduce operator (2114). Further, a difference is computed (2116) between the voxel grid 2002 from the previous level and the output of the expand operator (from 2114). The computed difference from the operations (2110) is stored as the data for current level $L_i$, at block 2120. These operations are repeated until the last level n is reached, n being a predetermined configurable value, as shown at block 2130. For the last level ($L_n$) of the pyramid 2000, there is no next level, so instead of the difference with the next level, the whole reduced voxel grid 2002 is stored, at block 2140.

Figure 24:
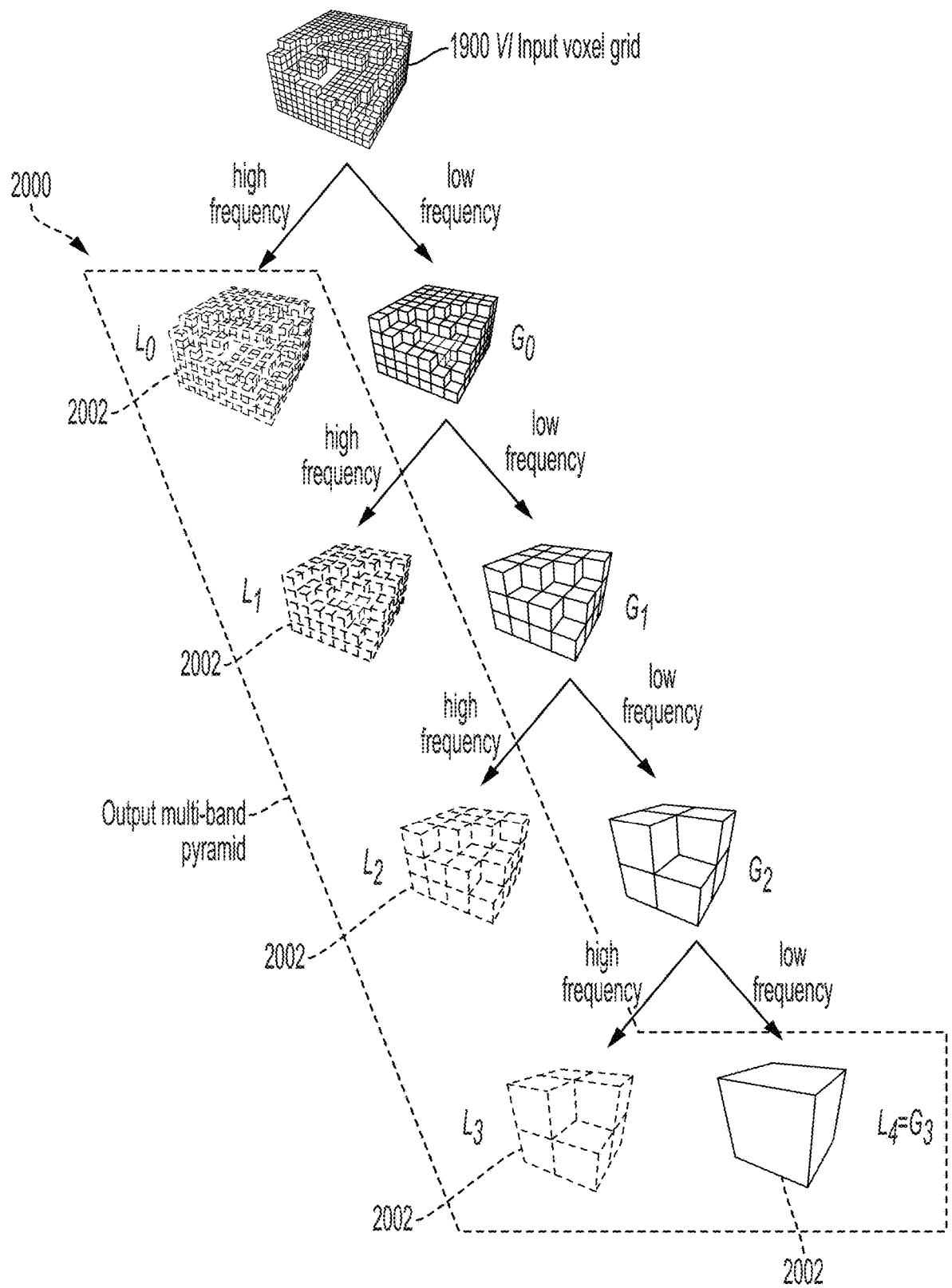
FIG. 24 shows a visual representation of converting a voxel grid to a multi-band pyramid according to one or more embodiments.

Table 4 depicts a sequence of the iterations shown in FIG. 23. FIG. 24 shows a visual representation of converting a voxel grid to a multi-band pyramid according to one or more embodiments, with n=4. The input voxel grid 1900 is converted to the multi-band pyramid 2000 with n=4 levels 2002 ($L_0, L_1, L_2, L_3, L_4$). As can be seen in FIGS. 23 and 24, intermediate data voxel grids $G_0, G_1, \ldots, G_n$ are created for computing the output of the reduce operator at each iteration. These intermediate voxel grids can be discarded after each iteration, and only the ($L_0, L_1, L_2, L_3, L_4$) are stored. Executing the method 2100, accordingly, converts the input voxel grid 1900 into multi-band pyramid 2000 by separating frequency bands of the attribute, such as intensity, color, at each level of the multi-band pyramid 2000. It is understood that the example shown in FIG. 24 has four levels in the multi-band pyramid 2000; however, in other embodiments, the number of levels can vary.

TABLE 4

Converting voxel grid into multi-band pyramid $G_0$ = reduce(VI)
$L_0$ = VI − expand($G_0$)
$G_1$ = reduce($G_0$)
$L_1$ = $G_0$ − expand($G_1$)
$G_2$ = reduce($G_1$)
$L_2$ = $G_1$ − expand($G_2$)
. . .

TABLE 4-continued

Converting voxel grid into multi-band pyramid $G_{n-1}$ = reduce($G_{n-2}$)
$L_{n-1}$ = $G_{n-2}$ − expand($G_{n-1}$)
$L_n$ = $G_{n-1}$ The multi-band pyramid 2000 can be reverted into the voxel grid 1900 by reversing the operations of method 2100 starting from the last level of the multi-band pyramid 2000 and combining all levels of the multi-band pyramid 800 together. Table 5 depicts the reversion.

TABLE 5

Converting multi-band pyramid to voxel grid $G_n$ = $L_n$
$G_{n-1}$ = $L_n$ + expand($G_n$)
. . .
$G_1$ = $L_2$ + expand($G_2$)
$G_0$ = $L_1$ + expand($G_1$)
VO = $L_0$ + expand($G_0$)

Figure 25:
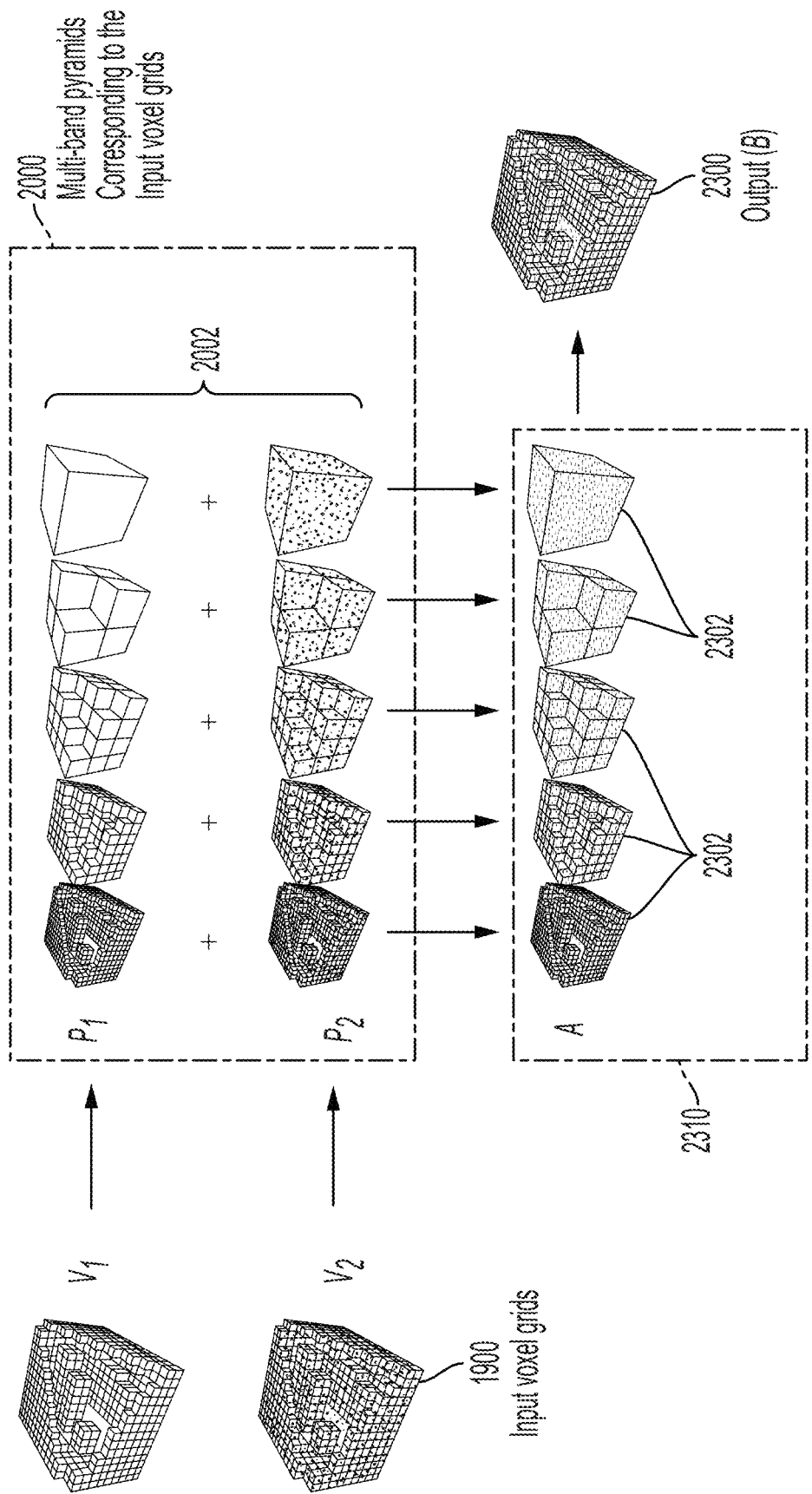
FIG. 25 depicts generating a voxel grid from multiple multi-band pyramids according to one or more embodiments.

Referring back to FIG. 20, the method 1800 further includes blending the attribute data of the voxel grids, at block 1806. The attribute data can be intensity values for $p_{IR}$ and color values for $p_{color}$. Embodiments described herein use at least two voxel grids 1900 ($V_1, V_2, \ldots, V_n$) as input, each corresponding to a data capture from a specific position by the 3D measuring device 100. The blending produces a single blended voxel grid (B) 2300 (FIG. 25) containing attribute data, e.g., intensity and color, from all of the input voxel grids 1900 blended together. B 2300 tessellates the same area in 3D space as the input voxel grids 1900 ($V_1, V_2, \ldots, V_n$) (that is, it has the same bounding cube as inputs).

All input voxel grids 1900 ($V_1, V_2, \ldots, V_n$) are in the same 3D coordinate system and have the same resolution. Further, B 2300 has the same resolution as input voxel grids 1900 ($V_1, V_2, \ldots, V_n$).

The blending of the multiple voxel grids 1900, using the corresponding multi-band pyramids 2000 includes blending corresponding levels 2002 of the multi-band pyramids 2000 together to create a blended multi-band pyramid. For blending each level 2002, averaging, weighted averaging, or any other aggregation operation can be performed.

Figure 26:
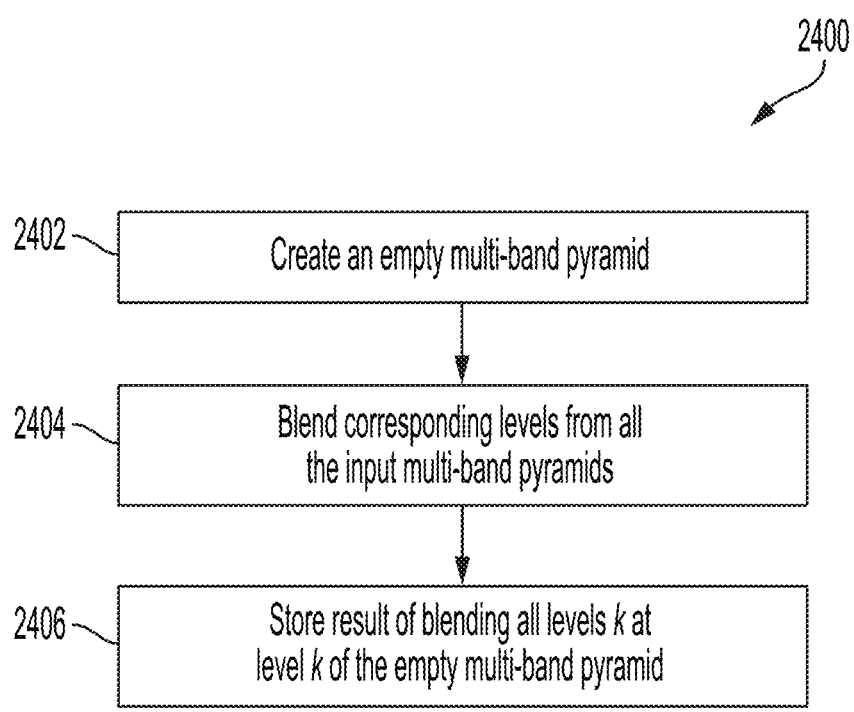
FIG. 26 depicts a flowchart for combining input voxel grids into a single blended output voxel grid according to one or more embodiments.

FIG. 26 depicts a flowchart for combining input voxel grids into a single blended output voxel grid according to one or more embodiments. The method 2400 includes creating an empty multi-band pyramid A 2310 (FIG. 25), at block 2402. The empty multi-band pyramid 2310 is configured so that the first level ($L_0$) is of the same resolution and coordinate system as the input voxel grids 1900 ($V_1, V_2, \ldots, V_n$). The corresponding levels 2002 of the multi-band pyramids 2000 corresponding to the input voxel grids ($V_1, V_2, \ldots, V_n$) 1900 are blended together using a mathematical operator, such as averaging, at block 2404. The result of the blending of each set of corresponding levels 2002 is stored in the corresponding level 2302 in the empty multi-band pyramid 2310, at block 2406.

During this operation, in one or more embodiments, only one input voxel grid 1900 is loaded in the memory at a time, and the input voxel grid 1900 can be unloaded as soon as its data are added to the running operation (e.g., average). This can be used to reduce memory consumption for very large datasets that include a number of voxel grids above a predetermined threshold.

TABLE 6

Blending colors of multiple voxel grids

1. Create empty pyramid A to store the running average. Level 0 in A has the same resolution and coordinate system as input voxel grids ($V_1, V_2, \ldots, V_n$)
2. For each input Vi
   Convert $V_i$ into a multi-band pyramid $P_i$
   Add each level of $P_i$ to the same level in the running average (A):

$$\text{level0}(A) \mathrel{+}= \frac{1}{n}\text{level0}(P_i) \quad (3)$$

$$\text{level1}(A) \mathrel{+}= \frac{1}{n}\text{level1}(P_i)$$

...

3. Merge levels of A into a single voxel grid (B)

In one or more embodiments, some voxels in a voxel grid 1900 can be empty. For example, such empty voxels may belong to an empty space inside/outside of the measured object surfaces. Alternatively, the empty voxels can belong to the areas not visible from a certain position of the 3D measuring device 100. To correctly handle empty voxels, the blending operation, e.g., averaging, is performed per voxel, and only blend non-empty voxels from each voxel grid 1900 to the running average, ignoring empty voxels.

Referring to method 1800 in FIG. 20, at block 1808, for each level in the multi-band pyramids 2000, a mapping function T is created to predict a color value from intensity value (1882). One or more known or later developed techniques can be used for the mapping. In some embodiments, For example, a neural network can be trained to make this prediction. Further, for each voxel v in $p_{IR}$ where there is no corresponding voxel in $p_{color}$, the transformation T is applied to the intensity value (from v) to get a predicted color for the corresponding voxel in $p_{color}$ (1884):

$$\text{color}_{point} = T(IR_{point}) - T(IR_{voxel}) + \text{expanded\_color}.$$

Here, two point clouds are used as inputs. One point cloud has 3D points from laser scanner, where each point has an intensity of reflection (IR) value (i.e., un-colored laser scanner point cloud). The other point cloud has the same points that are measured by the laser scanner, in which some of the points have been assigned a color, but for others, a color has not yet been assigned (because the point was not visible from any color camera image). The objective now is to assign color to these points. We create voxel grids from each of these point clouds (these voxel grids are the inputs mentioned in 1802). Each voxel in the voxel grid may contain many 3D points from the point cloud. Each of these points has an intensity of reflection (IR) value. A single IR value has to be assigned to the whole voxel. For this purpose, in some embodiments, a weighted average of the IR values for all the points inside the voxel is used. In the above equation, IR_point is the intensity value for each 3D point, and IR voxel is the average IR value for all the 3D points inside a particular voxel. The algorithm described here (1808, 1810) assigns a color value for each voxel in the voxel grid (and not to individual 3D points in the point cloud). After assigning the color value for each voxel, each point in the point cloud is colorized. This by assigning the color of the voxel to each 3D point, but making that color darker or lighter, depending on the difference between the original IR value of the point relative to the average IR of the voxel.

At 1810, the $p_{color}$ is converted to a voxel grid $b_p$. The conversion can be performed as described herein (Table 5).

In one or more embodiments, to avoid aliasing artefacts, the input point clouds 914, 924 are converted to the corresponding voxel grids 1900 by applying a low-pass filter that is called "smooth2" herein. It is understood that the low-pass filter can be named differently in other embodiments. The smooth2 filter behaves like the smooth low-pass filter (Table 1) described herein, which was used for creating levels of the multi-band pyramid 2000. The smooth2 takes a point cloud as an input instead of a voxel grid (in the case of the smooth operator), and therefore the smooth2 operator has an infinite sub-voxel accuracy. The operations for the smooth2 operator are depicted in Table 7.

The smooth2 operator converts an input point cloud C into a corresponding voxel grid V.

TABLE 7

Smooth2 Operator for converting a point cloud to a voxel grid

Let C be the input point cloud and V the output voxel grid.
For each voxel v in V, assign a color value using the following algorithm:
  $\text{sum}_w = 0$
  $\text{sum}_{attr} = (0, 0, 0)$
  For each point c in C:
    w = weight (c)
    $\text{sum}_w \mathrel{+}= w$
    $\text{sum}_{attr} \mathrel{+}= w * \text{attribute (c)}$
  Assign the weighted average to output voxel:
    color (v) = $\text{sum}_{attr}/\text{sum}_w$
The weight function can be defined as any function of the Euclidean distance between the position of point c and the center of voxel v.
For example, the Gaussian function can be used:

$$\text{weight}(c) = \exp\left(-\frac{\text{distance}(c, v)^2}{2\sigma^2}\right) \quad (4)$$

The $\sigma$ parameter of the Gaussian function controls the bandwidth. Choosing the right value for this parameter is application specific. E.g., $\sigma = 1$.

It should be noted that with a Gaussian weight function like the one given in Equation 4, when the distance is large enough, the value of weight becomes negligible. Hence, the implementation of smooth2 operator can be optimized by reducing the search area for calculating the color of each output voxel to only the neighborhood of points in the input point cloud that have non-negligible weights.

The smooth2 operator is applied to each input point cloud 914, 924 ($C_1, C_2, \ldots C_n$) separately to create a corresponding voxel grid 1900 ($V_1, V_2, \ldots, V_n$). The voxel grids 1900 are then be used to create a blended voxel grid 2300 (B) by using the method 2100 (FIG. 23).

The operations for such blending are depicted in Table 8. The compensation changes the attribute, such as color, of each point in a point cloud by finding how much the corresponding voxels from the original and blended voxel grid have changed.

In order to avoid aliasing (as a result of the limited resolution of the voxel grid), an upsampling operator, referred to herein as "point_expand" is used. It is understood that the operator can have a different name in different embodiments. The point_expand operator finds, with sub-voxel accuracy, an anti-aliased color value in the voxel grid B 1200 for an input 3D coordinate.

TABLE 8

Compensating point cloud attributes

Let V be the voxel grid resulted from converting C using smooth2 operator
   V = smooth2 (C)
For each point c in C, we assign a color value using the following algorithm:

original_attribute = point_expand(c, V)       (5)

blended_attribute = point_expand(c, B)

compensated_attribute (c) = attribute (c) − original attribute + blended_attribute
The point_expand operator is described herein.

The operations of the point_expand operator are listed in Table 9. The point_expand operator is similar to the smooth2 operator. It uses the same weight function that was used by the smooth2 operator. For a point (x, y, z), the point_expand operator computes a weight w based on each voxel v in the blended voxel grid B 2300. A sum of the weights based on all voxels is computed. Further, a sum of the weighted attribute value of the voxels is also computed. An attribute value r for the point is computed based on the sum of weighted attribute values and the sum of weights. In the depiction in Table 9, a ratio of the two values is computed; however, any other calculation can be performed.

TABLE 9

Point_expand operator

Let V be an input voxel grid that was created from a point cloud using smooth2 operator (see Table 7)
Let c be any input 3D coordinate (x, y, z)
Compute and assign attribute r to the input point coordinates c:
   $sum_w = 0$
   $sum_{attr} = (0,0,0)$
   For each voxel v in the input voxel grid V
      w = weight (v)
      $sum_w$ += w
      $sum_{attr}$ += w * attribute (v)
   Assign the weighted average of the attribute vectors as output:
      r = $sum_{attr}$ / $sum_w$
The same weight function that was used to create V from a point cloud (for example equation 5 from Table 7) is used here.

By applying the smooth2 and the point_expand operators, attribute value of each point in the input point clouds 914, 924 is compensated, i.e., blended, according to the blended voxel grid B 2300.

At block 1812, a color is assigned to the Type II pixel 1004 in the artificial image 1000 using $p_{color}$. The color is computed by first using point_expand operator on $b_p$ (from Table 9), at 1892. Further, at 1894 the color for the pixel 1004 is computed as:

$$color_{point} = T(IR_{point}) - T(IR_{voxel}) + expanded\_color$$

The color is computed for all the Type II pixels in this manner (FIG. 14) using the method 1800. In this manner, the artificial image 1000 can be generated with colors assigned to all the pixels 1004, even with all the four different types of occlusions. The artificial image 1000 is output once all the pixels 1004 are assigned a color, respectively.

Method 1800 requires that two pyramids (one for IR and one for color) have to be computed for each Type II pixel 1004 using the point clouds. This can be computationally resource intensive.

Figure 27:
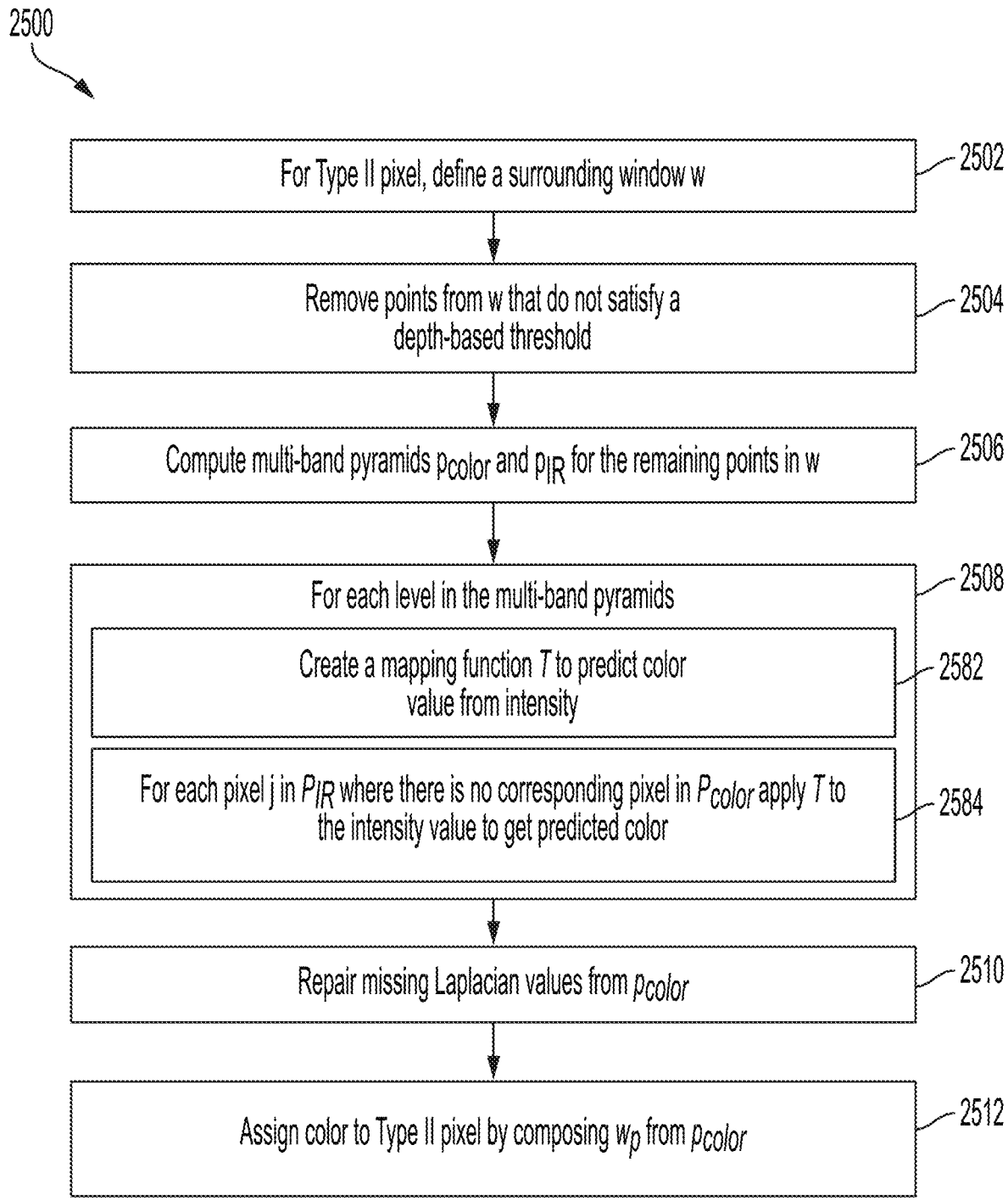
FIG. 27 depicts a flowchart of a method to determine color of a pixel with Type II occlusion according to one or more embodiments.
Figure 28:
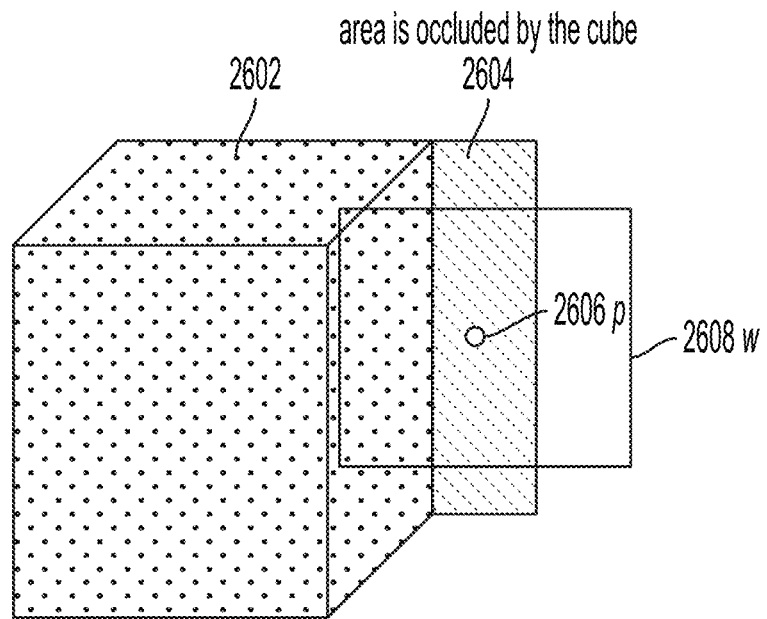
FIG. 28 depicts an example scenario to describe occlusion awareness as used by the method in FIG. 27.

FIG. 27 depicts a flowchart of a method 2500 to determine color of a pixel with Type II occlusion according to one or more embodiments. The method 2500 reduces the computational resources required compared to the method 1800. FIG. 28 depicts an example scenario to describe occlusion awareness as used by the method 2500. In the depicted example, the cube 2602 occludes the background 2604. Consider that the pixel 1004 that is to be painted corresponds to point p 2606, using points in a vicinity, say, window w 2608, of the point p 2606, without using any colors from points of the cube 2602.

Figure 29:
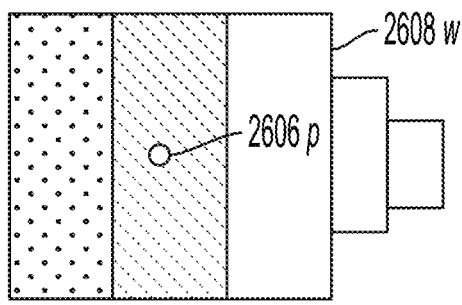
FIG. 29 visually depicts the conceptual operation of the method 2500 for the example from FIG. 28.
Figure 29:
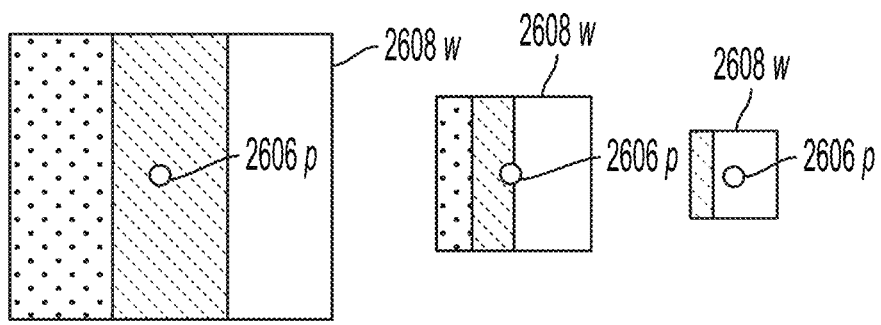

FIG. 29 visually depicts the conceptual operation of the method 2500 for the example from FIG. 28. After filtering out occluding pixels, the method 2500 includes creating multiple levels of a Laplacian pyramid for w 2606. The missing information for each level of this pyramid is repaired with help from intensity data from the point clouds 914, 924 captured by the scanner 20. A color for p is obtained in this manner.

Referring now to the flowchart of FIG. 27, the method 2500 includes, for the pixel 1004 of Type II occlusion, defining the window w 2608, at 2502. w 2608 is a predetermined dimensioned area with the pixel (p 2606) at the center.

At 2504, a first subset of points from the window w 2608 are filtered. In other words, a second subset of points from w 2608 are selected for further analysis. The points that are removed (not selected) are points q where |dist(q)−dist(p)|>ε. Here, ε is a distance threshold, for example ε=0.07× dist(p), and dist(x) is the distance of point x from projection center (i.e., depth of x). The depth can be determined from the point cloud 914, 924 by determining the scan-point corresponding to the pixel.

At 2506, for each of the selected points in w 2608 (i.e., the points that are not removed), two Laplacian pyramids $p_{IR}$ using intensity reflection and $p_{color}$ using color values for the remaining pixels in w 2608 are created. The pyramids 1900 are generated as described herein.

At 2508, for each level of the multi-band pyramids, a mapping function T is computed to predict color value from intensity value, at 2582. Further, for each pixel j in $p_{IR}$ where there is no corresponding pixel in $p_{color}$ the function T is applied to the intensity value to get a predicted color for the corresponding pixel in $p_{color}$, at 2584.

Further, at 2510, using $p_{color}$ missing Laplacian values are repaired. The $p_{color}$ is used to compose $w_p$ as a repaired image, at 2512. Here, $w_p$ is a modified version of the w 2608, where the pixels in w 2606 are assigned colors based on the missing Laplacian values computed. Accordingly, the point p 2608, which is in w 2606, is assigned a color value.

To summarize, there are two separate images, a color image (from coloring process), and a black-and-white or grayscale intensity of reflection (IR) image (from laser scanner). Because the color image is constructed using the artificially created view described herein, there may be pixels in that color image that do not have a color value. The objective of the algorithm/method is to assign a color to such pixels. A window is defined as a part (e.g., rectangular) of the images. For example, the window (w) can be a rectangle with top=100, bottom=200, left=300, right=400 where each of these is a pixel coordinate. Further, portions are cut from each of the two images based on coordinates of w. This way, we have two image segments (one for the color image, another for IR image). For each of these smaller image segments, a Laplacian pyramid is created, $p_{color}$ and $p_{IR}$, respectively.

Each of these pyramids is a collection of multiple levels, where each level is a 2D image. At each level of the pyramid for $p_{color}$, there may be pixels that do not have a color value assigned (because this pyramid is created from an artificial image with missing pixel values). But, there are also pixels with color values assigned. In other words, each level of $p_{color}$ is a 2D image with two types of pixels: pixels with color values; and pixels without color values.

The pixels with color values are used to create a mapping (T) between intensity of reflection and color. (2582) T is a function where it gets an intensity of reflection value as an input and predicts the color value. (for pixels with the same coordinates from $p_{IR}$ and $p_{color}$ respectively. After finding this mapping, T can be used to predict color for each of the pixels that do not have a color value assigned.

Accordingly, $p_{repaired}$ (a Laplacian pyramid) is generated where for each level of the pyramid, the value of each pixel is determined by: if $p_{color}$ has value at the same coordinates, use that color; and if $p_{color}$ does not have a value at the same coordinate, get the value of $p_{IR}$ at the same coordinates (say, $v_{IR}$) and assign $T(v_{IR})$ as the color of this pixel. Also, $w_p$ or $w_{repaired}$ is the window of the color image where pixels with missing color data are now filled with estimated colors based on intensity of reflection.

In this manner, the Type II pixels can be colorized to generate the artificial image 1000. The artificial image 1000 is output (1426) once all the pixels are assigned a color.

In some embodiments, the performance of the method 2500 can be further improved. The two pyramids (one for IR and one for color) have to be computed for each Type II pixel, and can be computationally resource intensive.

Figure 30:
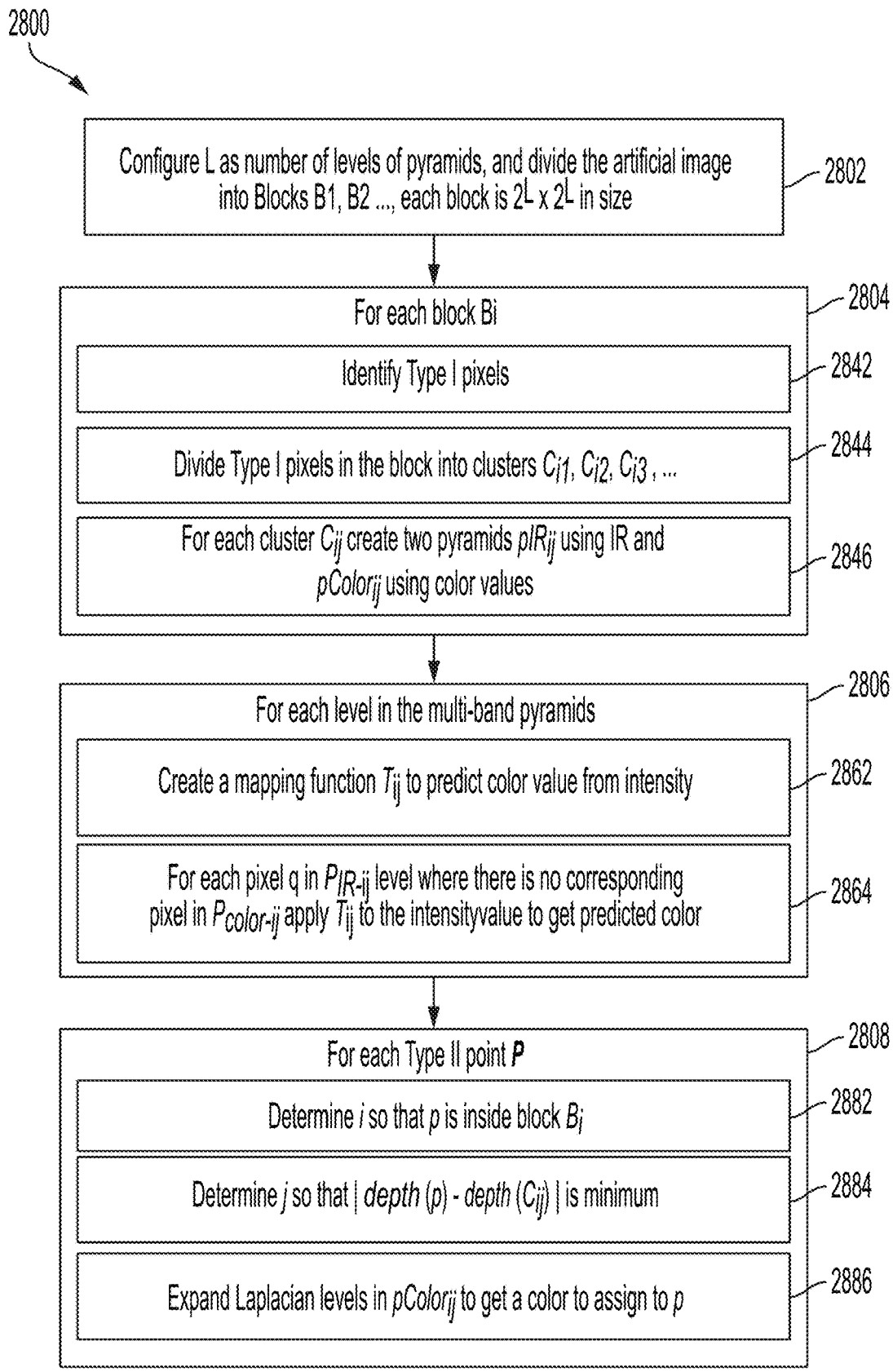
FIG. 30 depicts a flowchart of a method for determining a color for a pixel that has Type II occlusion according to one or more embodiments.

FIG. 30 depicts a flowchart of a method 2800 for determining a color for a pixel 1004 that has Type II occlusion according to one or more embodiments. In the method 2800, for each window w 2606, the necessary depth layers are computed and the Laplacian pyramids are computed for the entire block at those levels just once. Accordingly, the number of computations is reduced compared to method 2500, and thus, method 2800 provides a further improvement.

At 2802, a value L is configured as number of levels of pyramids. Further, the artificial image 1000 is divided into blocks B1, B2 ... Bn, each block being $2^L \times 2^L$ pixels in size. For example, L can be 3, 4, or any other integer.

At 2804, for each block Bi, the Type I pixels are identified (as described herein) at 2842, and the Type I pixels are clustered into clusters $C_{i_1}, C_{i_2}, C_{i_3}, \ldots$, at 2844. The clusters are created based on depth of pixels, where depth is length (pos−imagePos) for each pixel's corresponding 3D point.

Any clustering algorithm can be used, such as K-means, BIRCH, Centroid-based clustering, etc. Here, pos refers to the coordinates of the point in 3D space (x,y,z), and image-Pos refers to coordinates of the center of projection of the camera in 3D space (x,y,z) when capturing an image (corresponding to the point cloud that contains the 3D point pos). In other words, depth of each point (related to an image) is the Euclidean distance between that point and the camera 66 when the camera 66 captured the image.

At 2846, for each cluster $C_{i_j}$ two pyramids are created $pIR_{i_j}$ using IR and $pColor_{i_j}$ using color values. The pyramids are limited to have only L levels.

At 2806, Laplacian levels for each $pColor_{i_j}$ are repaired. The repairing, for each level in each pyramid $pColor_{i_j}$ and its corresponding $pIR_{i_j}$ includes, at 2862, creating a mapping function $T_{i_j}$ to predict color value from intensity. Further, at 2864, for each pixel q in $pIR_{i_j}$ level where there is no corresponding pixel in $pColor_{i_j}$, $T_{i_j}$ is applied to the intensity value to get predicted color.

At 2808, color is determined for each Type II point. For each Type II point p, at 2882, the index i is determined, such that p is inside block $B_i$. Further, at 2884, an index j is determined so that |depth(p)−depth($C_{i_j}$)| is minimum. The color for the point p is determined by expanding Laplacian levels in $pColor_{i_j}$, at 2886.

Several techniques are described herein for creating an artificial image at the same viewpoint of the laser scanner nodal point. The creation of the artificial panorama image has several advantages for example, speeding-up further processing, providing a bias-free viewpoint to laser nodal point, creating a view from any arbitrary point. Several applications, such as mobile mapping, can use such artificial images.

Figure 31:
FIG. 31 depicts an example artificial image with Type III occluded points colored using techniques described herein.
Figure 32:
FIG. 32 depicts the same artificial image from FIG. 31 with Type II occluded pixels also colored using any one of the techniques described herein.

FIG. 31 depicts an example artificial image 1000 with Type III occluded points colored using techniques described herein. The artificial image 1000 is the same that was presented in FIG. 10 with all occluded images being assigned a predetermined color (black) by default. Type II occluded pixels are not colored in FIG. 31. FIG. 32 depicts the same artificial image 1000 with Type II occluded pixels colored using any one of the techniques described herein. As can be seen, the artificial image 1000 is inpainted to color pixels in an accurate manner. It should be noted that the artificial image 1000 is not "captured" by the camera 66, rather constructed using data captured by the 3D measurement device 100 from other viewpoints, which are different from the viewpoint of the artificial image 1000.

Embodiments described herein can be used within the process of coloring a point cloud that is captured by the scanner 20, at least in the following modes: static scanning, and dynamic scanning (e.g., FARO® SWIFT®).

It should be appreciated that while embodiments herein describe the reduction of the image point residuals with reference to the use of the camera with the ultrawide-angle lens and a three-dimensional scanner, this is for example purposes and the claims should not be so limited. In other embodiments, the residual reduction could be used in other applications that use an omnidirectional camera, or a camera with a single ultrawide-angle lens to improve the accuracy of the image.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A system comprising:
   a three-dimensional (3D) scanner;
   a camera with a viewpoint that is different from a viewpoint of the 3D scanner; and
   one or more processors coupled with the 3D scanner and the camera, the one or more processors configured to:
      access a point cloud from the 3D scanner captured at a known position and one or more images from the camera captured at the known position, the point cloud comprises a plurality of 3D scan-points, each 3D scan-point represents a distance of a point in a surrounding environment from the 3D scanner, and an image comprises a plurality of pixels, each pixel represents a color of a point in the surrounding environment; and
      generate, using the point cloud and the one or more images, an artificial image that represents a portion of the surrounding environment, wherein generating the artificial image comprises colorizing each pixel in the artificial image,
   wherein colorizing each pixel in the artificial image comprises:
      determining, for a pixel in the artificial image, a corresponding 3D scan-point from the point cloud;
      computing, for the 3D scan-point, a distance of the 3D scan-point from the camera;
      determining, based on the distance, an occlusion type of the pixel, wherein the occlusion represents visibility of the 3D scan-point from the 3D scanner and from the camera; and
      assigning, the color to the pixel based on the occlusion type,
   characterized by, in response to determining that the occlusion type of the pixel is type-II wherein the 3D scan-point is visible from the 3D scanner, and not from the camera, assigning the pixel the color based on one or more multi-band pyramids, wherein assigning the color comprises:
      generating two multi-band pyramids, a multi-band intensity pyramid $p_{IR}$ and a multi-band color pyramid $p_{color}$ for each 3D scan-point in the point cloud;
      for each level in the two multi-band pyramids:
         creating a mapping function T to predict color value from intensity based on the two multi-band pyramids; and
         for each voxel v in $p_{IR}$ where there is no corresponding voxel in $p_{color}$ applying T to the intensity value of v to get predicted color;
      assigning the color to the pixel using $p_{color}$.

2. The system of claim 1, wherein in response to determining that the occlusion type of the pixel is type-I wherein the 3D scan-point is visible from both the 3D scanner and the camera, assigning the pixel the color as captured by the camera for the 3D scan-point.

3. The system of claim 1, wherein determining the depth of the pixel comprises:
   creating a depth map of the size of the artificial image;
   determining a depth pixel in the depth map for each type I pixel from the artificial image, wherein the type I pixel is associated with the 3D scan-point that is visible from the 3D scanner and the camera, and wherein the 3D scan-point is measured by the 3D scanner;
   assigning a depth value to the depth pixel in the depth map based on the 3D scan-point that is measured; and
   determining a depth of a type III pixel by creating a Laplacian pyramid based on the depth map.

4. The system of claim 1, wherein determining the depth of the pixel comprises:
   creating a depth map of the size of the artificial image;
   determining a depth pixel in the depth map for each type I pixel from the artificial image, wherein the type I pixel is associated with the 3D scan-point that is visible from the 3D scanner and the camera, and wherein the 3D scan-point is measured by the 3D scanner;
   assigning a depth value to the depth pixel in the depth map based on the 3D scan-point that is measured; and
   determining a depth of a type III pixel by using plane-fitting based on the depth map.

5. The system of claim 1, wherein assigning the color to the pixel using $p_{color}$ comprises:
   converting $p_{color}$ to a voxel grid $b_p$;
   performing a Laplacian repair on $b_p$ using a point_expand operator on $b_p$; and $$\text{computing the color} = T(IR_{point}) - T(IR_{voxel}) + \text{expanded\_color}.$$

6. The system of claim 1, wherein determining that the 3D scan-point is occluded from only one of the camera and the 3D scanner comprises determining that more than one point in the point cloud are back-projected onto the same pixel in an image captured by the camera.

7. The system of claim 1, wherein determining that the scan-point is occluded from only one of the camera and the 3D scanner is based on an angle between a normal of the 3D scan-point and a back-projected ray from the 3D scan-point to the camera.

8. The system of claim 1, wherein the camera is an integral part of the 3D scanner.

9. The system of claim 1, wherein the camera is at an arbitrary location, different from the 3D scanner.

10. A computer-implemented method comprising:
    accessing a point cloud from a 3D scanner captured at a known position and one or more images from a camera captured at the known position, the point cloud comprises a plurality of 3D scan-points, a 3D scan-point represents a distance of a point in a surrounding environment from the 3D scanner, and an image comprises a plurality of pixels, each pixel represents a color of a point in the surrounding environment; and
    generating, using the point cloud and the one or more images, an artificial image that represents a portion of the surrounding environment, wherein generating the artificial image comprises colorizing each pixel in the artificial image,
    wherein colorizing each pixel in the artificial image comprises:
       determining, for a pixel in the artificial image, a corresponding 3D scan-point from the point cloud;
       computing, for the 3D scan-point, a distance of the 3D scan-point from the camera;

determining, based on the distance, an occlusion type of the pixel, wherein the occlusion represents visibility of the 3D scan-point from the 3D scanner and from the camera; and assigning, the color to the pixel based on the occlusion type; and wherein in response to determining that the occlusion type of the pixel is type-II wherein the 3D scan-point is visible from the 3D scanner, and not from the camera, assigning the pixel the color based on one or more multi-band pyramids, wherein assigning the color comprises:

generating two multi-band pyramids, a multi-band intensity pyramid $p_{IR}$ and a multi-band color pyramid $p_{color}$ for each 3D scan-point in the point cloud;

for each level in the two multi-band pyramids:
  creating a mapping function T to predict color value from intensity based on the two multi-band pyramids; and
  for each voxel v in $p_{IR}$ where there is no corresponding voxel in $p_{color}$ applying T to the intensity value of v to get predicted color;

assigning the color to the pixel using $p_{color}$.

11. The computer-implemented method of claim 10, wherein in response to determining that the occlusion type of the pixel is type-III wherein the 3D scan-point is visible from the camera, and not from the 3D scanner, assigning the pixel a color of a corresponding pixel from an image from the one or more images from the camera, wherein determining the corresponding pixel comprises determining a depth of the pixel using depths assigned to a set of pixels in a predetermined vicinity of the pixel.

12. A computer program product comprising a memory device with computer executable instructions stored thereon, the computer executable instructions when executed by one or more processors cause the one or more processors to perform a method comprising:

accessing a point cloud from a 3D scanner and one or more images from a camera, the point cloud comprises a plurality of 3D scan-points, a 3D scan-point represents a distance of a point in a surrounding environment from the 3D scanner, and an image comprises a plurality of pixels, a pixel represents a color of a point in the surrounding environment; and generating, using the point cloud and the one or more images, an artificial image that represents a portion of the surrounding environment viewed from an arbitrary position in an arbitrary direction, wherein generating the artificial image comprises colorizing each pixel in the artificial image, wherein colorizing each pixel in the artificial image comprises:

determining, for a pixel in the artificial image, a corresponding 3D scan-point from the point cloud;

computing, for the 3D scan-point, a distance of the 3D scan-point from the camera;

determining, based on the distance, an occlusion type of the pixel, wherein the occlusion represents visibility of the 3D scan-point from the 3D scanner and from the camera; and assigning, the color to the pixel based on the occlusion type; and wherein in response to determining that the occlusion type of the pixel is type-II wherein the 3D scan-point is visible from the 3D scanner, and not from the camera, assigning the pixel the color based on one or more multi-band pyramids, wherein assigning the color comprises:

generating two multi-band pyramids, a multi-band intensity pyramid $p_{IR}$ and a multi-band color pyramid $p_{color}$ for each 3D scan-point in the point cloud;

for each level in the two multi-band pyramids:
  creating a mapping function T to predict color value from intensity based on the two multi-band pyramids; and
  for each voxel v in $p_{IR}$ where there is no corresponding voxel in $p_{color}$ applying T to the intensity value of v to get predicted color;

assigning the color to the pixel using $p_{color}$.

* * * * *